United States Patent
Chin et al.

(10) Patent No.: US 11,184,820 B2
(45) Date of Patent: Nov. 23, 2021

(54) FAST USER EQUIPMENT HANDOVER BETWEEN BASE STATIONS

(71) Applicant: QUALCOMM Incorporated, San Diego, CA (US)

(72) Inventors: Tom Chin, San Diego, CA (US); Ajith Tom Payyappilly, San Diego, CA (US); Min Wang, San Diego, CA (US); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 16/833,202

(22) Filed: Mar. 27, 2020

(65) Prior Publication Data

US 2020/0383021 A1    Dec. 3, 2020

Related U.S. Application Data

(60) Provisional application No. 62/854,705, filed on May 30, 2019.

(51) Int. Cl.
*H04W 36/08* (2009.01)
*H04W 36/00* (2009.01)
(Continued)

(52) U.S. Cl.
CPC .......... *H04W 36/08* (2013.01); *H04L 5/0051* (2013.01); *H04L 25/0226* (2013.01);
(Continued)

(58) Field of Classification Search
CPC ..... H04L 5/0048; H04L 5/005; H04L 5/0041; H04L 25/0224; H04L 25/0226;
(Continued)

(56) References Cited

U.S. PATENT DOCUMENTS

2017/0273069 A1\* 9/2017 Tenny ............... H04W 36/0072
2019/0053271 A1   2/2019 Islam et al.
(Continued)

FOREIGN PATENT DOCUMENTS

EP       3439374 A1    2/2019

OTHER PUBLICATIONS

International Search Report and Written Opinion—PCT/US2020/025828—ISA/EPO—dated Jul. 2, 2020.
(Continued)

*Primary Examiner* — Pao Sinkantarakorn
*Assistant Examiner* — Pawaris Sinkantarakorn
(74) *Attorney, Agent, or Firm* — Holland & Hart LLP/Qualcomm

(57) ABSTRACT

This disclosure provides systems, methods, and apparatus for wireless communications that support fast user equipment (UE) handover between base stations. A UE may receive, from a source base station, a configuration for reference signal transmission at a set of uplink transmit power levels. The UE may transmit multiple uplink reference signal repetitions based on the configuration. The source base station may transmit a request message to a target base station to measure the multiple uplink reference signal repetitions. The target base station may select an uplink reference signal and measure a transmit power correction. The target base station may transmit an indication to the source base station of the selection and transmit power correction. The source base station may evaluate the indications and select the target base station. The source base station may forward to the indicated contents, and the UE may switch and synchronize with the target base station.

30 Claims, 16 Drawing Sheets

(51) Int. Cl.
    *H04L 5/00*            (2006.01)
    *H04L 25/02*          (2006.01)
    *H04W 52/14*         (2009.01)
    *H04W 52/36*         (2009.01)
    *H04W 56/00*         (2009.01)
    *H04W 72/14*         (2009.01)
    *H04W 74/08*         (2009.01)

(52) U.S. Cl.
    CPC ..... *H04W 36/0058* (2018.08); *H04W 52/146* (2013.01); *H04W 52/367* (2013.01); *H04W 56/0045* (2013.01); *H04W 72/14* (2013.01); *H04W 74/0833* (2013.01)

(58) Field of Classification Search
    CPC ......... H04W 36/0016; H04W 36/0058; H04W 36/0072; H04W 36/0077; H04W 36/0085–0094; H04W 36/08; H04W 36/30; H04W 36/38; H04W 52/146; H04W 74/0833
    See application file for complete search history.

(56) References Cited

U.S. PATENT DOCUMENTS

2020/0068465 A1*   2/2020   Yu ......................... H04W 36/30
2020/0305094 A1*   9/2020   Ouchi ................... H04L 5/0055
2020/0383089 A1*  12/2020   Goto ..................... H04L 1/1812

OTHER PUBLICATIONS

Qualcomm Incorporated: "Uplink Grant for RACH-Less Handover", 3GPP TSG-RAN2 Meeting #95bis, 3GPP Draft, R2-167135_RACHLESSHO_Uplink_Grant, 3rd Generation Partnership Project (3GPP), Mobile Competence Centre; 650, Route Des Lucioles; F-06921 Sophia-Antipolis Cedex; France, vol. RAN WG2, No. Kaohsiung, Taiwan; Oct. 10, 2016-Oct. 14, 2016, Oct. 9, 2016 (Oct. 9, 2016), 3 Pages, XP051151529, Retrieved from the Internet: URL: http://www.3gpp.org/ftp/Meetings_GPP_SYNC/RAN2/Docs/ [retrieved on Oct. 9, 2016] the whole document.

* cited by examiner

FAST USER EQUIPMENT HANDOVER BETWEEN BASE STATIONS

CROSS REFERENCE

The present Application for Patent claims the benefit of U.S. Provisional Patent Application No. 62/854,705 by CHIN et al., entitled "FAST USER EQUIPMENT HANDOVER BETWEEN BASE STATIONS," filed May 30, 2019, assigned to the assignee hereof, and expressly incorporated by reference herein.

TECHNICAL FIELD

The following generally relates to wireless communications, and more specifically, to fast user equipment (UE) handover between base stations.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices (such as UEs). A UE may communicate with a base station (referred to as a source base station) as part of an active connection on a selected serving cell. In some implementations, however, a UE may experience degraded signal quality or reduced signal power due to signaling interference or mobility within the wireless communication system. Based on the variation in signal quality or signal power, the UE may request or be instructed to synchronize with a target cell and handover communication from the supporting base station to an alternative base station (referred to as a target base station) within the wireless communication system.

The handover may include a random access procedure for reconfiguring communication with the target base station, and may involve a series of handshake messages exchanged between the UE and the target base station. As part of a power control procedure, the UE may iteratively increment uplink transmit power for one or more random access message repetitions in order to achieve successful reception and decoding at the target base station. In some implementations, repetitive transmission by the UE may impose delays in synchronization for handover and increase latency in data transmission. Further, the one or more random access message repetitions may correspond to an inefficient allocation of power and channel resources. The described limitations may be problematic for NR systems, particularly for communication requiring low latency quality of service (QoS) or mission critical applications. Consequently, improved techniques for handover are desired.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication at a user equipment (UE). The method may include receiving, from a first base station, a configuration for reference signal transmission, the configuration including a set of uplink transmit power levels and a set of time and frequency resources, transmitting, based on the configuration, a set of uplink reference signals at different power levels, receiving from the first base station, based on transmitting the multiple uplink reference signals, an instruction to perform a handover to a second base station, the instruction including an indication of a selected uplink reference signal of the multiple uplink reference signals and a power parameter associated with the indicated uplink reference signal, and performing the handover to the second base station based on the instruction.

Another innovative aspect of the subject matter described in this disclosure can be implemented in an apparatus for wireless communication at a UE. The apparatus may include a first interface, a second interface, and a wireless modem coupled to the first interface and the second interface. The wireless modem may be configured to receive, from a first base station, a configuration for reference signal transmission, the configuration including a set of uplink transmit power levels and a set of time and frequency resources, transmit, based on the configuration, a set of uplink reference signals at different power levels, receive from the first base station, based on transmitting the multiple uplink reference signals, an instruction to perform a handover to a second base station, the instruction including an indication of a selected uplink reference signal of the multiple uplink reference signals and a power parameter associated with the indicated uplink reference signal, and perform the handover to the second base station based on the instruction.

Another innovative aspect of the subject matter described in this disclosure can be implemented in an apparatus for wireless communication at a UE. The apparatus may include means for receiving, from a first base station, a configuration for reference signal transmission, the configuration including a set of uplink transmit power levels and a set of time and frequency resources, transmitting, based on the configuration, a set of uplink reference signals at different power levels, receiving from the first base station, based on transmitting the multiple uplink reference signals, an instruction to perform a handover to a second base station, the instruction including an indication of a selected uplink reference signal of the multiple uplink reference signals and a power parameter associated with the indicated uplink reference signal, and performing the handover to the second base station based on the instruction.

Another innovative aspect of the subject matter described in this disclosure can be implemented in a non-transitory computer-readable medium storing code for wireless communication at a UE. The code may include instructions executable by a processor to receive, from a first base station, a configuration for reference signal transmission, the configuration including a set of uplink transmit power levels and a set of time and frequency resources, transmit, based on the configuration, a set of uplink reference signals at different power levels, receive from the first base station, based on transmitting the multiple uplink reference signals, an instruction to perform a handover to a second base station, the instruction including an indication of a selected uplink reference signal of the multiple uplink reference signals and a power parameter associated with the indicated uplink reference signal, and perform the handover to the second base station based on the instruction.

In some implementations, the method, apparatuses, and non-transitory computer-readable medium may include that the instruction further includes a set of parameters including the power parameter and one or more of a timing advance value or an uplink grant.

In some implementations, the method, apparatuses, and non-transitory computer-readable medium may include determining an uplink transmit power for transmission to the second base station based on the selected uplink reference signal and the power parameter.

In some implementations, the method, apparatuses, and non-transitory computer-readable medium may include transmitting, to the second base station, a handover complete message at the uplink transmit power.

In some implementations, the method, apparatuses, and non-transitory computer-readable medium may include transmitting, to the second base station, a first random access message of a random access procedure at the uplink transmit power.

In some implementations, the method, apparatuses, and non-transitory computer-readable medium may include transmitting, to the second base station, a second random access message of the random access procedure at a second uplink transmit power, the second random access message including a retransmission of the first random access message, and where the second uplink transmit power may be higher than the uplink transmit power.

In some implementations, the method, apparatuses, and non-transitory computer-readable medium may include determining, based on a measured signal quality, a measurement event, transmitting, to the first base station, a measurement report based on the measurement event, and where the set of uplink transmit power levels may be based on the measurement report.

In some implementations, the method, apparatuses, and non-transitory computer-readable medium may include that the power parameter includes a power correction value.

In some implementations, the method, apparatuses, and non-transitory computer-readable medium may include that the instruction further includes one or more of a timing advance value or an uplink grant.

In some implementations, the method, apparatuses, and non-transitory computer-readable medium may include that the multiple uplink reference signals include sounding reference signal repetitions.

One innovative aspect of the subject matter described in this disclosure can be implemented in a method of wireless communication at a first base station. The method may include transmitting, to a UE, a configuration for reference signal transmission, the configuration including a set of uplink transmit power levels and a set of time and frequency resources, transmitting, to a second base station, a first message including an indication of a set of uplink reference signals to measure from the UE, receiving, from the second base station, a second message in response to the first message, the second message including a selected uplink reference signal of the set of uplink reference signals and a power parameter, and transmitting, to the UE, an instruction to perform a handover to the second base station, the instruction including an indication of the selected uplink reference signal and the power parameter as part of a command for the handover to the second base station.

Another innovative aspect of the subject matter described in this disclosure can be implemented in an apparatus for wireless communication at a first base station. The apparatus may include a first interface, a second interface, and a wireless modem coupled to the first interface and the second interface. The wireless modem may be configured to transmit, to a UE, a configuration for reference signal transmission, the configuration including a set of uplink transmit power levels and a set of time and frequency resources, transmit, to a second base station, a first message including an indication of a set of uplink reference signals to measure from the UE, receive, from the second base station, a second message in response to the first message, the second message including a selected uplink reference signal of the set of uplink reference signals and a power parameter, and transmit, to the UE, an instruction to perform a handover to the second base station, the instruction including an indication of the selected uplink reference signal and the power parameter as part of a command for the handover to the second base station.

Another innovative aspect of the subject matter described in this disclosure can be implemented in an apparatus for wireless communication at a first base station. The apparatus may include means for transmitting, to a UE, a configuration for reference signal transmission, the configuration including a set of uplink transmit power levels and a set of time and frequency resources, transmitting, to a second base station, a first message including an indication of a set of uplink reference signals to measure from the UE, receiving, from the second base station, a second message in response to the first message, the second message including a selected uplink reference signal of the set of uplink reference signals and a power parameter, and transmitting, to the UE, an instruction to perform a handover to the second base station, the instruction including an indication of the selected uplink reference signal and the power parameter as part of a command for the handover to the second base station.

Another innovative aspect of the subject matter described in this disclosure can be implemented in a non-transitory computer-readable medium storing code for wireless communication at a first base station. The code may include instructions executable by a processor to transmit, to a UE, a configuration for reference signal transmission, the configuration including a set of uplink transmit power levels and a set of time and frequency resources, transmit, to a second base station, a first message including an indication of a set of uplink reference signals to measure from the UE, receive, from the second base station, a second message in response to the first message, the second message including a selected uplink reference signal of the set of uplink reference signals and a power parameter, and transmit, to the UE, an instruction to perform a handover to the second base station, the instruction including an indication of the selected uplink reference signal and the power parameter as part of a command for the handover to the second base station.

In some implementations, the method, apparatuses, and non-transitory computer-readable medium may include receiving, from the UE, a measurement report based on a measurement event, and determining the set of uplink transmit power levels may be based on the measurement report.

In some implementations, the method, apparatuses, and non-transitory computer-readable medium may include identifying the second base station based on the measurement report.

In some implementations, the method, apparatuses, and non-transitory computer-readable medium may include selecting the second base station for handover based on the receiving.

In some implementations, the method, apparatuses, and non-transitory computer-readable medium may include that the power parameter includes a power correction value.

In some implementations, the method, apparatuses, and non-transitory computer-readable medium may include that the instruction further includes one or more of a timing advance value or an uplink grant.

In some implementations, the method, apparatuses, and non-transitory computer-readable medium may include that the multiple uplink reference signals include sounding reference signal repetitions.

One innovative aspect of the subject matter described in this disclosure can be implemented in a method of wireless communication at a second base station. The method may include receiving, from a first base station, a first message including an indication of a set of uplink reference signals to measure from a UE, selecting, based on the receiving, an uplink reference signal of the set of uplink reference signals, determining a power parameter based on the selecting of the uplink reference signal, and transmitting, to the first base station, a second message in response to the first message, the second message including the selected uplink reference signal and the power parameter.

Another innovative aspect of the subject matter described in this disclosure can be implemented in an apparatus for wireless communication at a second base station. The apparatus may include a first interface, a second interface, and a wireless modem coupled to the first interface and the second interface. The wireless modem may be configured to receive, from a first base station, a first message including an indication of a set of uplink reference signals to measure from a UE, select, based on the receiving, an uplink reference signal of the set of uplink reference signals, determine a power parameter based on the selecting of the uplink reference signal, and transmit, to the first base station, a second message in response to the first message, the second message including the selected uplink reference signal and the power parameter.

Another innovative aspect of the subject matter described in this disclosure can be implemented in an apparatus for wireless communication at a second base station. The apparatus may include means for receiving, from a first base station, a first message including an indication of a set of uplink reference signals to measure from a UE, selecting, based on the receiving, an uplink reference signal of the set of uplink reference signals, determining a power parameter based on the selecting of the uplink reference signal, and transmitting, to the first base station, a second message in response to the first message, the second message including the selected uplink reference signal and the power parameter.

Another innovative aspect of the subject matter described in this disclosure can be implemented in a non-transitory computer-readable medium storing code for wireless communication at a second base station. The code may include instructions executable by a processor to receive, from a first base station, a first message including an indication of a set of uplink reference signals to measure from a UE, select, based on the receiving, an uplink reference signal of the set of uplink reference signals, determine a power parameter based on the selecting of the uplink reference signal, and transmit, to the first base station, a second message in response to the first message, the second message including the selected uplink reference signal and the power parameter.

In some implementations, the method, apparatuses, and non-transitory computer-readable medium may include receiving, from the first base station, a forwarding of user data for the UE based on a handover of service, and buffering the user data for the UE based on the receiving.

In some implementations, the method, apparatuses, and non-transitory computer-readable medium may include receiving, from the UE, a handover complete message based on the transmitting.

In some implementations, the method, apparatuses, and non-transitory computer-readable medium may include receiving, from the UE, a first random access message of a random access procedure based on the transmitting.

In some implementations, the method, apparatuses, and non-transitory computer-readable medium may include receiving, from the UE, a second random access message of the random access procedure, the second random access message including a retransmission of the first random access message at a higher uplink transmit power, and where receiving the second random access message may be based on an inability to decode the first random access message.

In some implementations, the method, apparatuses, and non-transitory computer-readable medium may include that the power parameter includes a power correction value.

In some implementations, the method, apparatuses, and non-transitory computer-readable medium may include determining one or more of a timing advance value or an uplink grant, and transmitting the timing advance value or the uplink grant as part of the second message.

In some implementations, the method, apparatuses, and non-transitory computer-readable medium may include that the multiple uplink reference signals include sounding reference signal repetitions.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
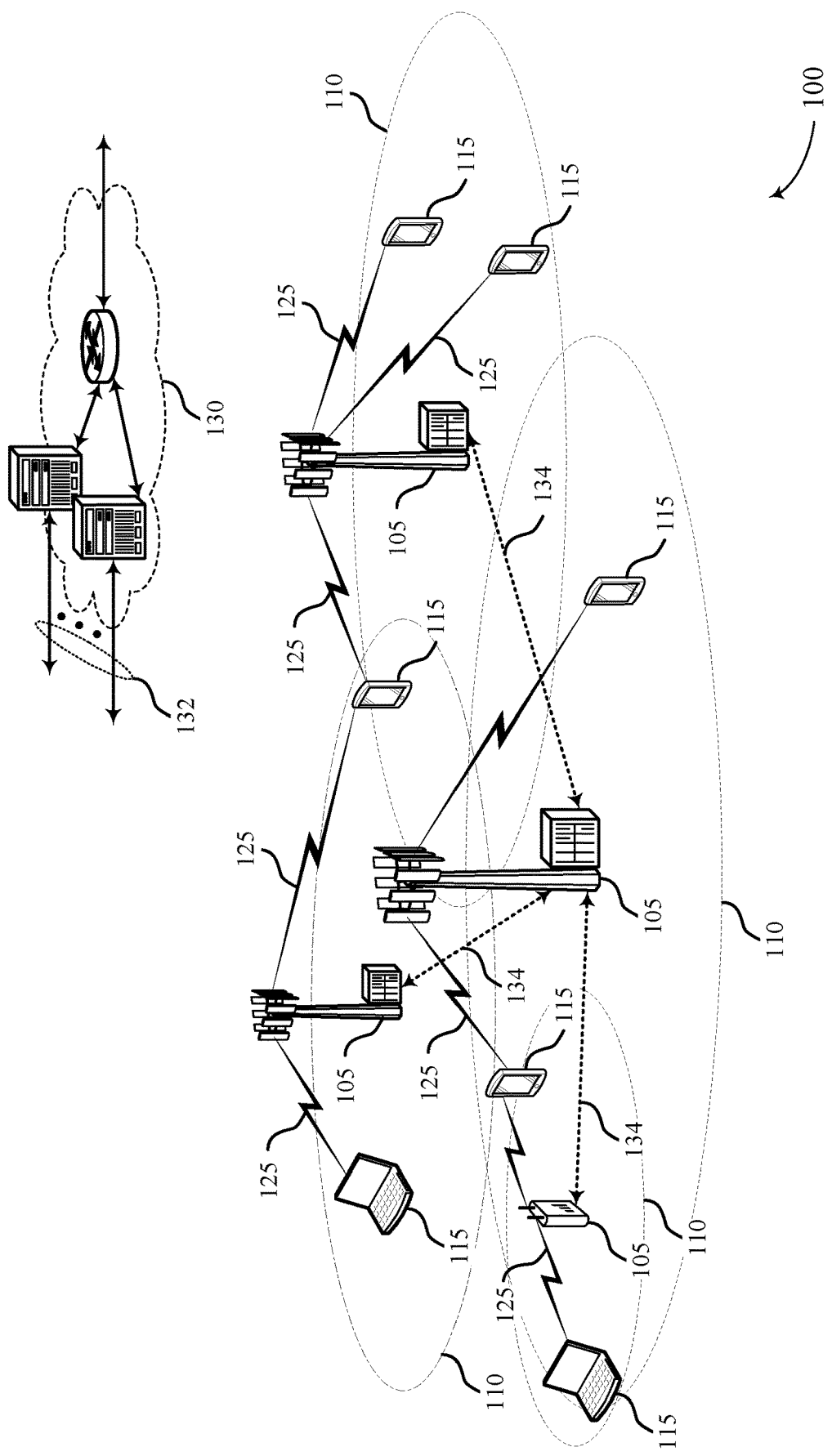
FIG. 1 illustrates an example of a wireless communications system that supports fast user equipment (UE) handover between base stations.

The following description is directed to implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the 3GPP standards, or any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), New Radio (NR), AMPS, or other known signals that are used to communicate within a wireless, cellular or interne of things (IOT) network, such as a system utilizing 3G, 4G or 5G, or further implementations thereof, technology.

In some implementations, a user equipment (UE) may experience degraded signal quality or power due to interference on a wireless channel or attenuation associated with mobility, and a serving base station. The variation in signal quality or signal power may prompt a source base station to perform a handover of the UE to a target base station. Prior to performing the handover, the source base station may indicate a configuration for the UE to perform uplink reference signal transmission. The configuration may include a set of uplink transmit power levels and a set of time and frequency resources for transmitting multiple uplink reference signal repetitions. In addition, the source base station may transmit a request message to the one or more target base stations including an instruction to measure the multiple uplink reference signal repetitions from the UE.

Accordingly, the UE may transmit multiple uplink reference signal repetitions at different uplink transmit power levels. Each of the one or more target base stations may measure the received uplink reference signals and determine an uplink power level for the UE. For example, a respective target base station may select an uplink reference signal from the received uplink reference signals as a baseline for UE uplink power based on a measured receive power of the selected uplink reference signal. In some implementations, a target base station may determine a transmit power correction parameter from the selected uplink reference signal. The one or more target base stations may transmit a response to the source base station including an indication of the determined uplink power level for the UE. The indication of the uplink power level for the UE may, for example, include the selected uplink reference signal and any determined power correction parameter. Upon selecting a target base station for the handover, the source base station may transmit to the UE a handover command including an indication of the uplink power level selected by the target base station, which may include the indicated uplink reference signal selection and transmit power correction parameter.

Particular implementations of the subject matter described in this disclosure may be implemented to realize one or more of the following potential advantages. For example, the indicated uplink reference signal selection and transmit power correction may be used by the UE for reducing delay associated with connecting to a target base station as part of a handover procedure by reducing or eliminating power ramping during a random access procedure. In some implementations, the UE may eliminate power ramping portions of the random access procedure entirely and proceed to transmitting a handover complete indication to the target base station based on the identified uplink reference signal selection and transmit power correction parameter. Additionally, or alternatively, the UE may implement the identified uplink reference signal selection and transmit power correction as a baseline uplink transmit power for beginning the random access procedure, which may reduce the number of power ramping iterations performed during the random access procedure. The described implementations may reduce latency of handover and suspension of data transmission, and therefore increase signaling reliability, throughput, and user experience while reducing power consumption. The described advantages may be particularly beneficial for NR systems and communication requiring low latency quality of service (QoS) or corresponding to mission critical applications.

FIG. 1 illustrates an example of a wireless communications system 100 that supports fast UE handover between base stations. The wireless communications system 100 includes base stations 105, UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, wireless communications system 100 may support enhanced broadband communications, ultra-reliable (such as, mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (such as, macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some implementations, a base station 105 may be movable and therefore provide communication coverage for a moving geographic coverage area 110. In some implementations, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (such as, over a carrier), and may be associated with an identifier for distinguishing neighboring cells (such as, a physical cell identifier (PCID), a virtual cell identifier (VCID)) operating via the same or a different carrier. In some implementations, a carrier may support multiple cells, and different cells may be configured according to different protocol types (such as, machine-type communication (MTC), narrowband Internet-of-Things (NB-IoT), enhanced mobile broadband (eMBB), or others) that may provide access for different types of devices. In some implementations, the term "cell" may refer to a portion of a geographic coverage area 110 (such as, a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some implementations, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (such as, via Machine-to-Machine (M2M) communication). M2M communication or MTC may refer to data communication technologies that allow devices to communicate with one another or a base station 105 without human intervention. In some implementations, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (such as, a mode that supports one-way communication via transmission or reception, but not transmission and reception simultaneously). In some implementations half-duplex communications may be performed at a reduced peak rate. Other power conservation techniques for UEs 115 include entering a power saving "deep sleep" mode when not engaging in active communications, or operating over a limited bandwidth (such as, according to narrowband communications). In some implementations, UEs 115 may be designed to support critical functions (such as, mission critical functions), and a wireless communications system 100 may be configured to provide ultra-reliable communications for these functions.

In some implementations, a UE 115 may also be able to communicate directly with other UEs 115 (such as, using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some implementations, groups of UEs 115 communicating via D2D communications may utilize a one-to-many (1:M) system in which each UE 115 transmits to every other UE 115 in the group. In some implementations, a base station 105 facilitates the scheduling of resources for D2D communications. In some other implementations, D2D communications are carried out between UEs 115 without the involvement of a base station 105.

Base stations 105 may communicate with the core network 130 and with one another. For example, base stations 105 may interface with the core network 130 through backhaul links 132 (such as, via an S1, N2, N3, or another interface). Base stations 105 may communicate with one another over backhaul links 134 (such as, via an X2, Xn, or other interface) either directly (such as, directly between base stations 105) or indirectly (such as, via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (such as, control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (such as, radio heads and access network controllers) or consolidated into a single network device (such as, a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (such as, less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (such as, from 30 GHz to 300 GHz), also known as the millimeter band. In some implementations, wireless communications system 100 may support millimeter wave (mmW) communications between UEs 115 and base stations 105, and EHF antennas of the respective devices may be even smaller and more closely spaced than UHF antennas. In some implementations, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some implementations, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some implementations, operations in unlicensed bands may be based on a carrier aggregation configuration in conjunction with component carriers operating in a licensed band (such as, LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some implementations, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (such as, a base station 105) and a receiving device (such as, a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (such as, the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (such as, a base station 105 or a UE 115) to shape or steer an antenna beam (such as, a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (such as, with respect to the antenna array of the transmitting device or receiving device, or with respect to some other orientation).

In one example, a base station 105 may use multiple antennas or antenna arrays to conduct beamforming operations for directional communications with a UE 115. For instance, some signals (such as synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (such as, by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (such as, a direction associated with the receiving device, such as a UE 115). In some implementations, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (such as, for identifying a beam direction for subsequent transmission or reception by the UE 115), or transmitting a signal in a single direction (such as, for transmitting data to a receiving device).

A receiving device (such as, a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some implementations a receiving device may use a single receive beam to receive along a single beam direction (such as, when receiving a data signal). The single receive beam may be aligned in a beam direction determined based at least in part on listening according to different receive beam directions (such as, a beam direction determined to have a highest signal strength, highest signal-to-noise ratio, or otherwise acceptable signal quality based at least in part on listening according to multiple beam directions).

In some implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some implementations, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some implementations, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the physical layer, transport channels may be mapped to physical channels.

In some implementations, UEs 115 and base stations 105 may support retransmissions of data to increase the likelihood that data is received successfully. HARQ feedback is one technique of increasing the likelihood that data is received correctly over a communication link 125. HARQ may include a combination of error detection (such as, using a cyclic redundancy check (CRC)), forward error correction (FEC), and retransmission (such as, automatic repeat request (ARQ)). HARQ may improve throughput at the MAC layer in poor radio conditions (such as, signal-to-noise conditions). In some implementations, a wireless device may support same-slot HARQ feedback, where the device may provide HARQ feedback in a specific slot for data received in a previous symbol in the slot. In some other implementations, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (such as, depending on the length of the cyclic prefix prepended to each symbol period). Excluding the cyclic prefix, each symbol period may contain 2048 sampling periods. In some implementations, a subframe may be the smallest scheduling unit of the wireless communications system 100, and may be referred to as a transmission time interval (TTI). In some other implementations, a smallest scheduling unit of the wireless communications system 100 may be shorter than a subframe or may be dynamically selected (such as, in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling.

A carrier may be associated with a pre-defined frequency channel (such as, an evolved universal mobile telecommunication system terrestrial radio access (E-UTRA) absolute radio frequency channel number (EARFCN)), and may be positioned according to a channel raster for discovery by UEs 115. Carriers may be downlink or uplink (such as, in an FDD mode), or be configured to carry downlink and uplink communications (such as, in a TDD mode). In some implementations, signal waveforms transmitted over a carrier may be made up of multiple sub-carriers (such as, using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (such as, LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (such as, synchronization signals or system information, etc.) and control signaling that coordinates operation for the carrier. In some implementations (such as, in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some implementations, control information transmitted in a physical control channel may be distributed between different control regions in a cascaded manner (such as, between a common control region or common search space and one or more UE-specific control regions or UE-specific search spaces).

A carrier may be associated with a particular bandwidth of the radio frequency spectrum, and In some implementations the carrier bandwidth may be referred to as a "system bandwidth" of the carrier or the wireless communications system 100. For example, the carrier bandwidth may be one of a number of predetermined bandwidths for carriers of a particular radio access technology (such as, 1.4, 3, 5, 10, 15, 20, 40, or 80 MHz). In some implementations, each served UE 115 may be configured for operating over portions or all of the carrier bandwidth. In some other implementations, UEs 115 may be configured for operation using a narrowband protocol type that is associated with a predefined portion or range (such as, set of subcarriers or RBs) within a carrier (such as, "in-band" deployment of a narrowband protocol type).

In a system employing MCM techniques, a resource element may consist of one symbol period (such as, a duration of one modulation symbol) and one subcarrier, where the symbol period and subcarrier spacing are inversely related. The number of bits carried by each resource element may depend on the modulation scheme (such as, the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (such as, spatial layers), and the use of multiple spatial layers may further increase the data rate for communications with a UE 115.

Devices of the wireless communications system 100 (such as, base stations 105 or UEs 115) may have a hardware configuration that supports communications over a particular carrier bandwidth, or may be configurable to support communications over one of a set of carrier bandwidths. In some implementations, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some implementations, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some implementations, an eCC may be associated with a carrier aggregation configuration or a dual connectivity configuration (such as, when multiple serving cells have a suboptimal or non-ideal backhaul link). An eCC may also be configured for use in unlicensed spectrum or shared spectrum (such as, where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (such as, to conserve power).

In some implementations, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (such as, according to frequency channel or carrier bandwidths of 20, 40, 60, 80 MHz, etc.) at reduced symbol durations (such as, 16.67 microseconds). A TTI in eCC may consist of one or multiple symbol periods. In some implementations, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some implementations, NR shared spectrum may increase spectrum utilization and spectral efficiency, specifically through dynamic vertical (such as, across the frequency domain) and horizontal (such as, across the time domain) sharing of resources.

A UE 115 may communicate with a base station 105 (also referred to as a source base station) via an established communication, in which the UE 115 may be configured in a radio resource control connected state (RRC_CONNECTED). The UE 115 and the base station 105 may communicate bidirectionally via a communication link 125, and utilize one or more frequency carriers for control and data transmission. For example, the base station 105 may indicate a measurement configuration to the UE 115. The measurement configuration may include specified resources (such as carrier frequencies) and reporting configurations (such as measurement events) for periodic measurement reporting by the UE 115. In some implementations, the UE 115 may initiate periodic measurement of the active communication on the serving cell, as well as identified signaling corresponding to one or more alternative base stations 105 providing communication coverage for one or more neighboring cells. For example, as part of the reporting configuration, the base station 105 may indicate to the UE 115 to measure one or more of the reference signal receive power (RSRP) or reference signal receive quality (RSRQ) associated with a serving cell of the connection, as well as the one or more neighboring cells of the wireless communications system 100. Based on the associated RSRP or RSRQ values satisfying a configured threshold value (or measurement event), the UE 115 may initiate measurement reporting to the base station 105.

In some implementations, the UE may experience degraded signal quality or power due to interference within a supported coverage area 110 of the serving cell. Additionally, or alternatively, mobility at the UE 115 may increase signaling attenuation over a communication link 125, particularly when operating at a boundary (also referred to as an edge) of the coverage area 110. The variation in signal quality or signal power may correspond to a measurement event and prompt the UE 115 to transmit measurement reporting to the base station 105. Based on the measurement report, the base station 105 may identify one or more neighboring cells and transmit a command for handover to a target base station 105 that supports communication for a neighboring cell, as indicated. The command may include information for RRC connection re-configuration, as well as identifier information for the target base station 105.

The UE 115 may receive the command for handover and perform a random access procedure for reconfiguring the RRC connection with the target base station 105. The UE 115 may initiate the random access procedure by transmitting a first random access message, which may include a preamble (also referred to a random-access channel (RACH) preamble, a physical RACH (PRACH) preamble, or a sequence) that may carry information, such as a UE identifier. The purpose of the preamble transmission may be to provide an indication to the target base station 105 of presence of a random access attempt, and to allow the target base station 105 to determine a delay (such as a timing delay) between the base station 105 and the UE 115.

The preamble of the first random access message may, in some implementations, be defined by a preamble sequence and a cyclic prefix. A preamble sequence may be defined based in part on a Zadoff-Chu sequence. The UE 115 may additionally, or alternatively, use a guard period to handle timing uncertainty in transmission. In some implementations, the uncertainty in uplink timing may be based in part on a dimension (such as size, area) of the serving cell. Therefore, including a cyclic prefix may be beneficial, in some implementations, for handling the uncertainty in uplink timing. Per cell, there may be a number of preamble sequences (such as 64 preamble sequences). The UE 115 may select a preamble sequence from a set of sequences in the serving cell based in part on a random selection. In some implementations, the UE 115 may select a preamble sequence based in part on an amount of traffic that the UE 115 has for transmission on an uplink shared channel (UL-SCH). In some other implementations, the UE 115 may select a preamble sequence based on whether the random access procedure is be contention-based or contention-free. When performing a contention-based random access procedure, the UE 115 may select a preamble sequence from a set of sequences. Alternatively, the preamble sequence to use may be explicitly signaled as part of the handover command.

The UE 115 may transmit the first random access message and subsequently monitor a downlink channel for reception of a second random access message (also referred to as a random access response message) during a response window. The response window may be configured according to a timer. In some implementations, an uplink transmit power for signaling the first random access message may be insufficient for reception and decoding at the target base station 105. As a result, the UE 115 may monitor the response window and fail to receive a random access response prior to the timer expiration. The UE 115 may retransmit the first random access message while incrementing the uplink transmit power for transmission. In some implementations, the UE 115 may perform retransmission of the first random access message according to a PRACH coverage enhancement (CE) level. The UE 115 may iteratively increment uplink transmit power for retransmission until the UE 115 successfully receives a random access response from the base station alternative 105.

Following successful reception and decoding at the target base station 105, the UE 115 may receive the random access response from the target base station 105 on a downlink shared channel (DL-SCH) or a physical downlink control channel (PDCCH). In some implementations, the random access response may have a same or a different configuration (format) compared to the preamble sequence. The random access response may carry information for the UE 115, including an index of a preamble sequence detected and for which the response is valid, a timing advance value may be determined based in part on the preamble sequence detected, a scheduling grant indicating time and frequency resources for the UE 115 to use for transmission of a next random access message transmission, or a network identifier (such as a RA-RNTI) for further communication.

Following reception of the random access response, the UE 115 may transmit third random access message to the target base station 105 indicating completion of the RRC connection re-configuration. The UE 115 may transmit the third random access message using the UL-SCH resources assigned in the scheduling grant, and may transmit the message according to the timing advance value provided in the random access response. Based on successful reception of the third random access message, the target base station 105 may synchronize with the UE 115, and the UE 115 may read the system information associated with the new serving cell. The target base station 105 may transmit a path switch request to an MME of the network in order to modify the downlink path at the serving gateway. The MME may forward one or more tunnel endpoint identifiers to the serving gateway along with the interne protocol (IP) address of the target base station 105. The serving gateway may redirect one or more tunnels for one or more bearers and transmit an acknowledgement to the MME.

In some implementations, however, the power control procedure of the UE 115 may introduce large delay and disruption for data transmission following an initiated handover procedure. For example, during a handover procedure, data transmission associated with the UE 115 may be suspended. The UE 115 may perform repetitive random access message transmission that is based on incremental increases to uplink transmit power, and may impose delays in synchronization for handover and increase latency for suspended data transmission. Further, the one or more random access message repetitions may correspond to an inefficient allocation of power and channel resources. The described limitations may be problematic for NR systems, particularly for communication requiring low latency quality of service (QoS) or mission critical applications.

As described herein, in some implementations, a base station 105 supporting an established communication link with the UE 115 may indicate a configuration of resources for reference signal transmission. The configuration of resources may include a set of uplink transmit power levels and a set of time and frequency resources for transmitting multiple uplink reference signal repetitions. In addition, the base station 105 may transmit a request message to the one or more target base stations 105 that are associated with neighboring cells relative to the UE 115. The request message may include an indication to measure the multiple uplink reference signal repetitions.

The UE 115 may subsequently transmit multiple uplink reference signal repetitions at different uplink transmit power levels. Each of the one or more target base stations 105 may measure the received uplink reference signals, select an uplink reference signal from the received uplink reference signals based on a measured receive power (for example, RSRP) and, in some instances, determine a transmit power correction. Each of the one or more target base stations 105 may transmit a response to the base station 105 (associated with the serving cell) indicating a respective uplink reference signal and transmit power correction. As part of the handover procedure, the base station 105 may evaluate the received responses and select an target base station 105 for reconfigured communication with the UE 115. The base station 105 may transmit a handover command to the UE 115 for initiating handover to the selected target base station 105.

Figure 2:
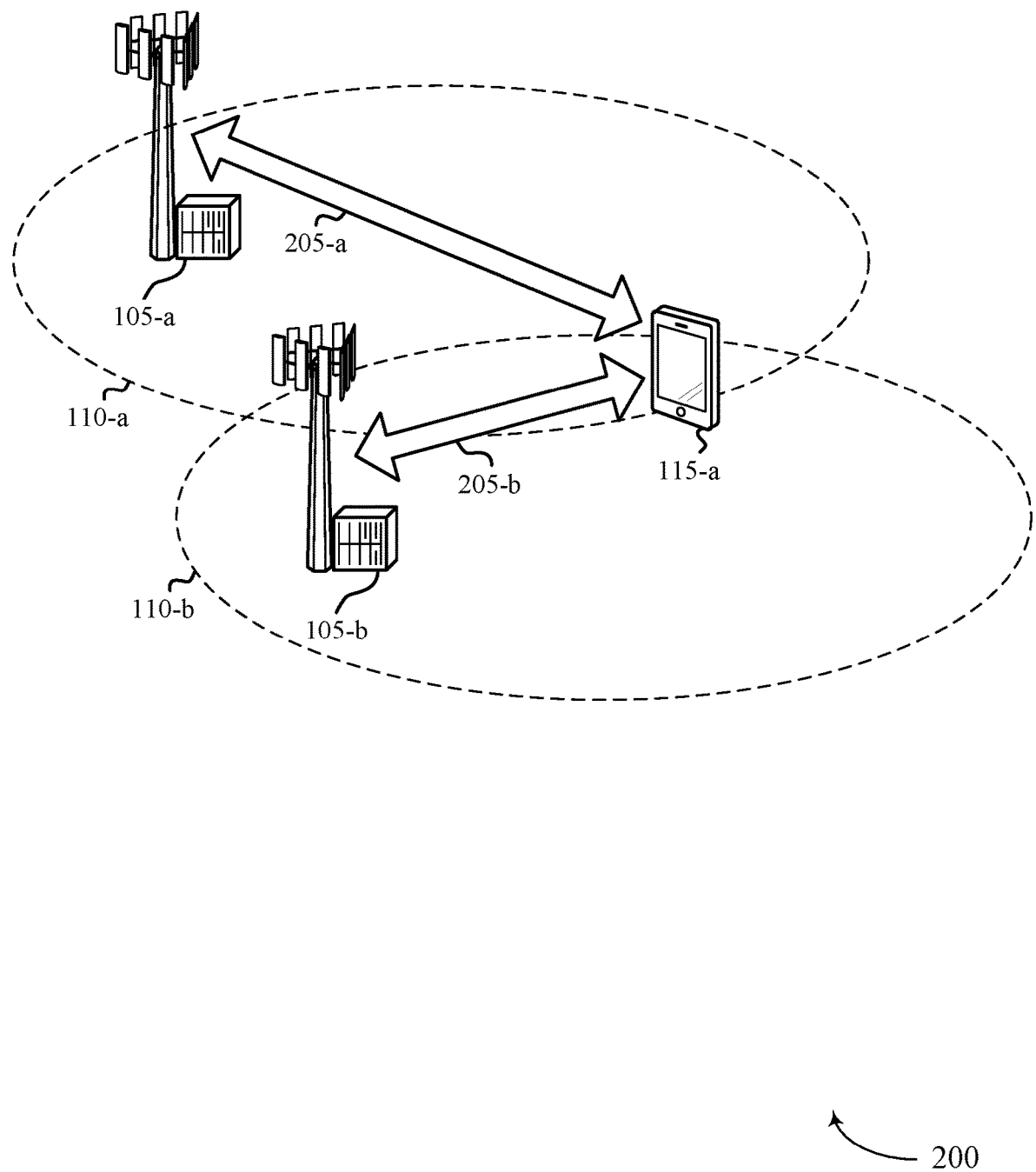
FIG. 2 illustrates an example of a wireless communications system that supports fast UE handover between base stations.

FIG. 2 illustrates an example of a wireless communications system 200 that supports fast UE handover between base stations. In some implementations, the wireless communications system 200 may implement aspects of the wireless communications system 100. For example, the wireless communications system 200 may support handover procedure from the base station 105-$a$ to the base station 105-$b$, or vice versa.

The wireless communications system 200 may include the set of base stations 105-$a$ and 105-$b$ which may be examples of the corresponding devices described with reference to FIG. 1. The base stations 105-$a$ and 105-$b$ may support cell deployments on different coverage areas 110-$a$ and 110-$b$. In some implementations, the coverage areas 110-$a$ and 110-$b$ may overlap in geographic coverage. In some other implementations, the coverage areas 110-$a$ and 110-$b$ may be separated by a geographic distance or interleaved by one or more neighboring coverage areas. The cell deployments associated with the base stations 105-$a$ and 105-$b$ may share a common carrier frequency within the channel or correspond to different carrier frequencies. In some implementations, cells corresponding to different carrier frequencies may share a common priority. The wireless communications system 200 may further include a UE 115-$a$ which may be an example of the corresponding devices described with reference to FIG. 1. In some implementations, the UE 115-$a$ may support signaling associated with low latency QoS or mission critical applications.

The UE 115-$a$ and the base station 105-$a$ may have an established connection, and communicate over the communication link 205-$a$. The base station 105-$a$ may correspond to a source base station associated with the UE 115-$a$ and provide communication coverage for a serving cell associated with the coverage area 110-$a$. The UE 115-$a$ may be configured in a radio resource control connected state (RRC-_CONNECTED), and utilize one or more frequency carriers of the communication link 205-$a$ for data transmission and reception. The base station 105-$a$ and the UE 115-$a$ may support multiple radio access technologies including 4G systems such as LTE systems, LTE-A systems, or LTE-A Pro systems, and 5G systems which may be referred to as NR systems.

As part of the established connection, the base station 105-$a$ may indicate a measurement configuration to the UE 115-$a$. The measurement configuration may include specified resources (such as carrier frequencies) and reporting configurations (such as measurement events) for periodic measurement reporting by the UE 115-$a$. In some implementations, the UE 115-$a$ may initiate periodic measurement of the active communication on the serving cell, as well as identified signaling corresponding to one or more alternative base stations, such as the base station 105-$b$. For example, as part of the reporting configuration, the base station 105-$a$ may indicate to the UE 115-$a$ to measure one or more of the reference signal receive power (RSRP) or reference signal receive quality (RSRQ) associated with a serving cell of the connection, as well as the one or more neighboring cells of the wireless communications system 200.

In some implementations, the UE 115-$a$ may experience degraded signal quality or power due to interference within a supported coverage area 110-$a$ of the serving cell. Additionally, or alternatively, mobility at the UE 115-$a$ may increase signaling attenuation over a communication link 205-$a$, particularly when operating at a boundary (also referred to as an edge) of the coverage area 110-$a$. The variation in signal quality or signal power may correspond to a measurement event and prompt the UE 115-$a$ to transmit a measurement report to the base station 105-$a$. Based on the measurement report, the base station 105-$a$ may identify one or more neighboring cells within the wireless communication system 200. The base station 105-$a$ may configure a handover procedure for synchronizing with a target cell and switching communication to an alternative base station 105 (also referred to as a target base station). For example, the source base station may configure resources for the UE 115-$a$ to perform subsequent uplink reference signal transmission. The configuration of resources may include a set of uplink transmit power levels and a set of time and frequency resources for transmitting multiple uplink reference signal repetitions.

In some implementations, as described herein, the UE 115 may transmit multiple uplink reference signal repetitions at different uplink transmit power levels. The one or more alternative base stations 105, including the base station 105-$b$, may receive the multiple uplink reference signal repetitions, and transmit a response to the base station 105-$a$. The response may include a selected uplink reference signal from the received uplink reference signals and, in some instances, a transmit power correction. As part of the handover procedure, the base station 105-$a$ may evaluate the received responses and, following the decision to perform handover, select the base station 105-$b$ for reconfigured communication on a communication link 205-$b$.

The described implementations may promote one or more of the following potential advantages. For example, the indicated uplink reference signal selection and transmit power correction may be used by the UE 115-$a$ for reducing delay associated with random access procedure. By utilizing the received parameters, the UE 115-$a$ may obviate or reduce the number of random access message iterations for reconfiguring connection with the base station 105-b as part of a handover procedure. The described implementations may reduce latency of handover and suspension of data transmission, and therefore increase signaling reliability.

Figure 3:
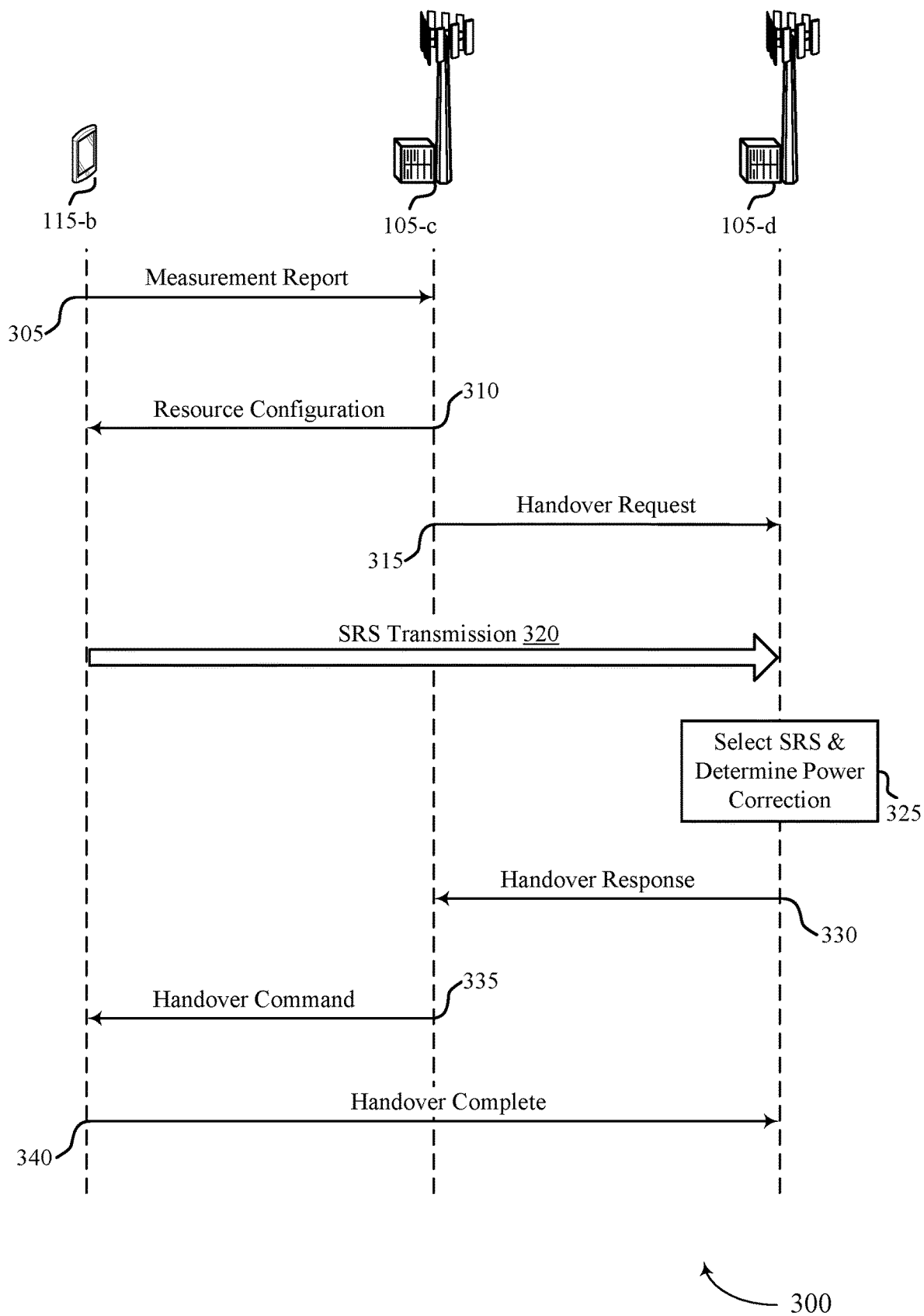
FIG. 3 illustrates an example of a process flow that supports fast UE handover between base stations.

FIG. 3 illustrates an example of a process flow 300 that supports fast UE handover between base stations. The process flow 300 may include a UE 115-b and a set of base stations 105-c and 105-d which may be examples of the corresponding devices described with reference to FIGS. 1 and 2. In some implementations, the base station 105-c may correspond to a source base station in communication with the UE 115-b, and the base station 105-d may correspond to a target base station for handover. The process flow 300 may include aspects for multiple reference signal transmission by the UE 115-b, as well as low latency handover to the base station 105-d based on the multiple reference signal transmission. The process flow 300 may further include aspects for obviating random access procedure as part of a connection reconfiguring for the handover, as described with reference to FIGS. 1 and 2. Alternative examples of the following may be implemented, where some steps may be performed in a different order than described or not performed at all. In some implementations, steps may include additional features not mentioned below, or further steps may be added.

At 305, the UE 115-b may transmit a measurement report to the base station 105-c based on a prompted measurement event. For example, as part of a received reporting configuration, the UE 115-b may measure one or more of an RSRP or RSRQ associated with a serving cell of the connection, as well as the one or more identified neighboring cells. Based on the associated RSRP or RSRQ values satisfying a configured threshold value (or measurement event), the UE 115-b may transmit the measurement report to the base station 105-c. In some implementations the measurement events may be preconfigured and correspond to one or more index values of a table. The UE 115-b may transmit the measurement report periodically based on a configured report interval.

At 310, the base station 105-c may identify signaling associated with the UE 115-b is weak, and indicate a configuration of resources for uplink reference signal transmission at the UE 115-b. In some implementations, the base station may indicate the configuration of resources as part of a semi-static configuration distinct from the measurement reporting. In some other implementations, the configuration of resources may be based on the measurement reporting, in which the set of uplink transmit power levels may be based on the measurement of signaling on the serving cell and the one or more indicated neighboring cells. The configuration of resources may include a set of uplink transmit power levels $P_j$, and a set of time and frequency resources $R_j$, as shown below:

$(P_j, R_j)$, where $j=1, \ldots, N$

The set of uplink transmit power levels $P_j$ may correspond to incremental transmit power increases (in decibels (dB)) associated with the index values 1 to N. Additionally, the set of time and frequency resources $R_j$ may be based on a reference signal repetition associated with a pseudo random hopping.

Based on the received measurement report, the base station 105-c may identify one or more alternative base stations associated with neighboring cells, including the base station 105-d. At 315, the base station 105-c may transmit a handover request to the one or more alternative base stations including an indication to measure the receive power of the multiple uplink reference signal repetitions configured for the UE 115-b. Based on the configuration, at 320, the UE 115-b may transmit the multiple uplink reference signal repetitions at different uplink transmit power levels according to the set of index values $(P_j, R_j)$. In some implementations, the multiple uplink reference signals may correspond to sounding reference signal (SRS) repetitions.

The base station 105-d may receive at least a portion of the multiple uplink reference signals. At 325, the base station 105-d may select an uplink reference signal (for example, $SRS_k$) from the received uplink reference signals based on a measured receive power. The uplink reference signal $SRS_k$ may be associated with the transmit power level and resource index values $(P_k, R_k)$ of the configuration. In some implementations, the base station 105-d may select the uplink reference signal $SRS_k$ based on a highest measured receive quality or receive power relative to one or more alternative uplink reference signals of the received uplink reference signals. In some other implementations, the base station 105-d may select the uplink reference signal $SRS_k$ based on an efficiency operation (such as a low battery operation), in which the selected uplink reference signal $SRS_k$ satisfies a receive quality and receive power. The base station 105-d may determine a power parameter, such as a power correction value $\Delta P$, if the selected transmit power level index $P_k$ may be further adjusted to increase reception reliability. Additionally, the base station 105-d may identify a timing advance value or a scheduling grant (also referred to as an uplink grant) indicating time and frequency resources for the UE 115-b to use for subsequent transmission.

At 330, the base station 105-d may transmit a handover response to the base station 105-c. The handover response may include an indication of the selected uplink reference signal $SRS_k$ and, in some implementations, the determined power correction value $\Delta P$. Additionally, in some implementations, the handover response may include the timing advance value or the scheduling grant for the UE 115-b. The base station 105-c may receive the handover response in conjunction with one or more additional handover responses from the one or more alternative base stations associated with neighboring cells. As part of the handover procedure, the base station 105-c may evaluate the received responses and select the base station 105-d as a target base station for handover of the UE 115-b. At 335, the base station 105-c may forward to the indicated contents of the handover response (such as the uplink reference signal $SRS_k$, the power correction value $\Delta P$, the timing advance value, and the scheduling grant) to the UE 115-b as part of an instruction to perform handover.

Based on the received instruction, the UE 115-b may switch and synchronize with the target cell supported by the base station 105-d and reconfigure communication based on the handover. The UE 115-b may apply a transmit power associated with the transmit power level index $P_k$ and based on the power correction value $\Delta P$. At 340, the UE 115-b may transmit a handover complete message to the base station 105-d using the applied transmit power. Based on successful reception of the handover complete message, the base station 105-d may synchronize with the UE 115-b, and the UE 115-b may read the system information associated with the new serving cell. The UE 115-b and the base station 105-d may re-initiate data transmission on a new communication link associated with the target cell.

The described features of the process flow 300 may be implemented to realize one or more of the following potential advantages. For example, the indicated uplink reference signal selection and transmit power correction may be used by the UE 115-b for reducing the number of power ramping iterations performed during the random access procedure. Based on the handover complete message, the UE 115-b may synchronize with a target cell and reconfigure connectivity with the base station 105-d while obviating random access procedure entirely. Consequently, the described features of process flow 300 may reduce latency of handover and reduce disruption time due to suspension of data transmission, and therefore increase signaling reliability.

Figure 4:
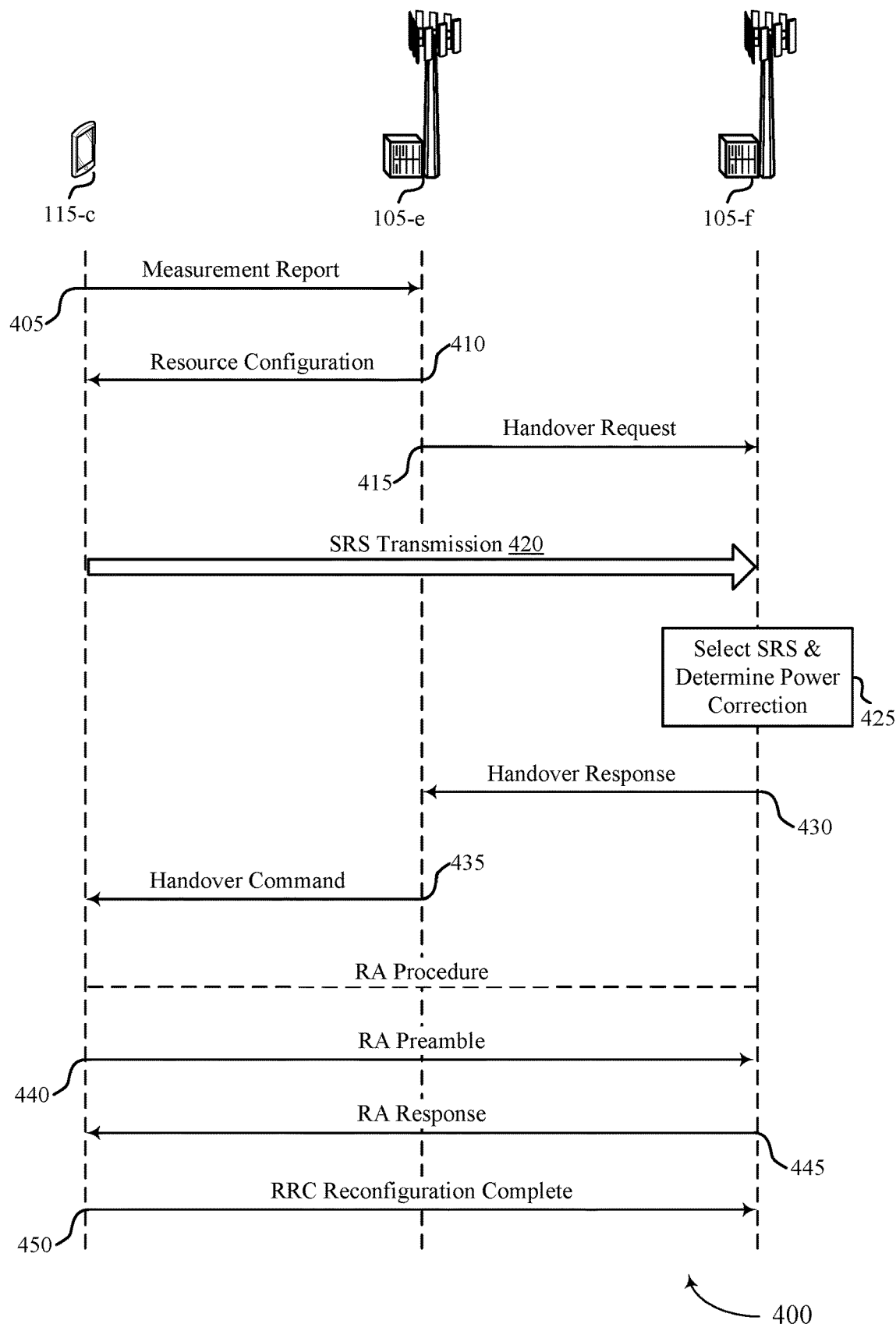
FIG. 4 illustrates an example of a process flow that supports fast UE handover between base stations.

FIG. 4 illustrates an example of a process flow 400 that supports fast UE handover between base stations. The process flow 400 may include a UE 115-c and a set of base stations 105-e and 105-f which may be examples of corresponding devices described with reference to FIGS. 1-3. In some implementations, the base station 105-e may correspond to a source base station in communication with the UE 115-c, and the base station 105-f may correspond to a target base station for handover. The process flow 400 may include aspects for multiple reference signal transmission by the UE 115-c, as well as low latency handover to the base station 105-f based on the multiple reference signal transmission, as described with reference to FIG. 3. The process flow 400 may further include aspects for reducing the number of random access message iterations for reconfiguring connection based on the handover, as described with reference to FIGS. 1-3. Alternative examples of the following may be implemented, where some steps may be performed in a different order than described or not performed at all. In some implementations, steps may include additional features not mentioned below, or further steps may be added.

At 405, the UE 115-c may transmit a measurement report to the base station 105-e based on a prompted measurement event. For example, the UE 115-c may measure one or more of an RSRP or RSRQ associated with a serving cell of the connection, as well as the one or more identified neighboring cells. Based on the associated RSRP or RSRQ values satisfying a configured threshold value (or measurement event), the UE 115-c may signal a measurement reporting to the base station 105-e.

At 410, the base station 105-e may identify signaling associated with the UE 115-c is weak, and indicate a configuration of resources for uplink reference signal transmission. In some implementations, the base station may indicate the configuration of resources as part of a semi-static configuration distinct from the measurement reporting. In some other implementations, the configuration of resources may be based on the measurement reporting, in which the set of uplink transmit power levels may be based on the measurement of signaling on the serving cell and the one or more indicated neighboring cells. The configuration of resources may include a set of uplink transmit power levels $P_j$, and a set of time and frequency resources $R_j$, as shown below:

$(P_j, R_j)$, where $j=1, \ldots, N$

The set of uplink transmit power levels $P_j$ may correspond to incremental transmit power increases (in dB) associated with the index values 1 to N. Additionally, the set of time and frequency resources $R_j$ may be based on a reference signal repetition associated with a pseudo random hopping.

Based on the received measurement report, the base station 105-e may identify one or more alternative base stations associated with neighboring cells, including the base station 105-f. At 415, the base station 105-e may transmit a handover request to the one or more alternative base stations, including an indication to measure the receive power of the multiple uplink reference signal repetitions. At 420, the UE 115-c may transmit the multiple uplink reference signal repetitions at different uplink transmit power levels according to the set of index values $(P_j, R_j)$. In some implementations, the multiple uplink reference signals may correspond to SRS repetitions.

The base station 105-f may receive at least a portion of the multiple uplink reference signals. At 425, the base station 105-f may select an uplink reference signal (for example, $SRS_k$) from the received uplink reference signals based on a measured receive power. The uplink reference signal $SRS_k$ may be associated with the transmit power level and resource index values $(P_k, R_k)$ of the configuration. The base station 105-f may determine a power parameter, such as a power correction value $\Delta P$, if the selected transmit power level index $P_k$ may be further adjusted to increase reception reliability. Additionally, the base station 105-f may identify a timing advance value or a scheduling grant (also referred to as an uplink grant) indicating time and frequency resources for the UE 115-c to use for subsequent transmission.

At 430, the base station 105-f may transmit a handover response to the base station 105-e. The handover response may include an indication of the selected uplink reference signal $SRS_k$ and, in some implementations, the determined power correction value $\Delta P$. Additionally, in some implementations, the handover response may include the timing advance value or the scheduling grant for the UE 115-c. The base station 105-e may receive the handover response in conjunction with one or more additional handover responses from the one or more alternative base stations associated with neighboring cells. As part of the handover procedure, the base station 105-e may evaluate the received responses and select the base station 105-f as a target base station for handover of the UE 115-c. At 435, the base station 105-e may forward to the indicated contents of the handover response (such as the uplink reference signal $SRS_k$, the power correction value $\Delta P$, the timing advance value, and the scheduling grant) to the UE 115-c as part of an instruction to perform handover.

Based on the received instruction, the UE 115-c may switch and synchronize with the target cell supported by the base station 105-f. The UE 115-c may apply a transmit power associated with the transmit power level index $P_k$ and based on the power correction value $\Delta P$. The UE 115-c may initiate a random access procedure for reconfiguring communication based on the handover. At 440, the UE 115-c may transmit a first random access message to the base station 105-f using the applied transmit power. The first random access message may include a preamble (also referred to a RACH preamble, a PRACH preamble, or a sequence) that may carry information, such as a UE identifier. The purpose of the preamble transmission may be to provide an indication to the alternative base station 105 of presence of a random access attempt, and to allow the alternative base station 105 to determine a delay (such as a timing delay) between the base station 105-f and the UE 115-c.

Following the transmission of the first random access message, the UE 115-c may monitor a downlink channel for reception during a response window. The response window may be configured according to a timer. In some implementations, due to mobility of the UE 115-c within a system, applied transmit power may be insufficient for reception and decoding at the base station 105-f As a result, the UE 115-c may monitor the response window and fail to receive a random access response prior to the timer expiration. The UE 115-*c* may retransmit the first random access message while incrementing the uplink transmit power for transmission. In some implementations, the incrementation of the uplink transmit value may correspond to a preconfigured value at the UE 115-*c*. In some other implementations, the incrementation of the uplink transmit value may be based on the power correction value ΔP.

The base station 105-*f* may successfully receive the first random access message including the preamble, and at 445, transmit a second random access message (also referred to as a random access response message) to the UE 115-*c*. The random access response may carry information for the UE 115-*c*, including one or more of an index of a preamble sequence detected and for which the response is valid, an updated timing advance value, a scheduling grant, or a network identifier (such as a RA-RNTI) for further communication.

The UE 115-*c* may receive the random access response from the base station 105 on carrier frequencies associated with DL-SCH or PDCCH during a response window. At 450, the UE 115-*c* may transmit a third random access message to the base station 105-*f* indicating completion of the RRC connection re-configuration. Based on successful reception of the third random access message, the base station 105-*f* may synchronize with the UE 115-*c*, and the UE 115-*c* may read the system information associated with the new serving cell. The UE 115-*c* and the base station 105-*f* may re-initiate data transmission on a new communication link associated with the target cell.

The described features of the process flow 400 may be implemented to realize one or more of the following potential advantages. For example, the indicated uplink reference signal selection and transmit power correction may be used by the UE 115-*c* for reducing delay associated with random access procedure. The UE 115-*c* may implement the indicated uplink reference signal selection and transmit power correction as a baseline transmit power which may reduce the number of power ramping iterations performed during the random access procedure. By utilizing the received parameters, the UE 115-*c* may reduce the number of random access message iterations for reconfiguring connection with the base station 105-*f*. Consequently, the described features of process flow 400 may reduce latency of handover and reduce disruption time due to suspension of data transmission, and therefore increase signaling reliability.

Figure 5:
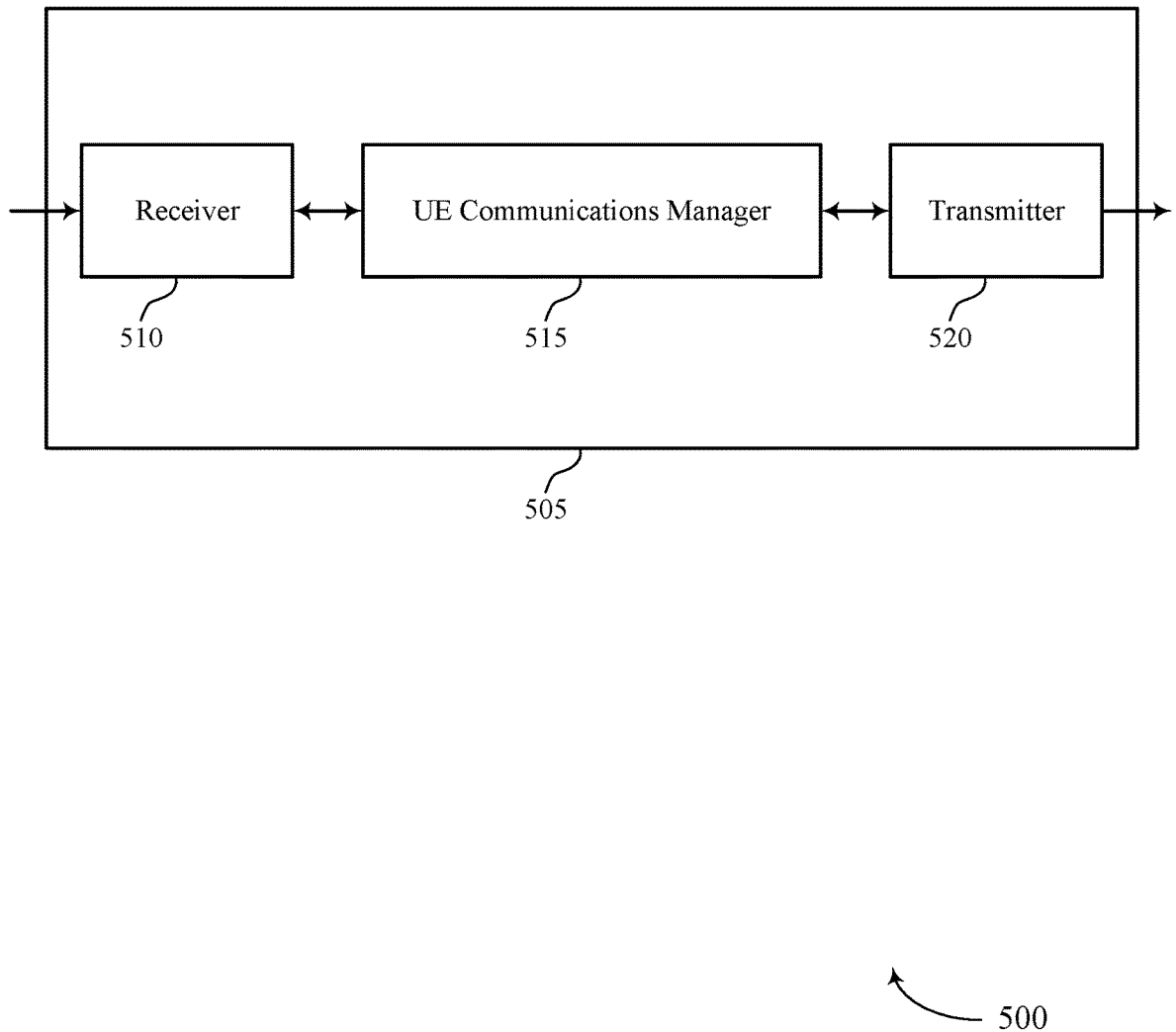
FIGS. 5 and 6 show block diagrams of example devices that support fast UE handover between base stations.

FIG. 5 shows a block diagram 500 of an example device 505 that supports fast UE handover between base stations. The device 505 may be an example of aspects of a UE 115 as described herein. The device 505 may include a receiver 510, a UE communications manager 515, and a transmitter 520. The device 505 may also include a processor. Each of these components may be in communication with one another (such as, via one or more buses).

The receiver 510 may receive information such as packets, user data, or control information associated with various information channels (such as, control channels, data channels, and information related to fast user equipment handover between base stations, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may receive, from a first base station, a configuration of resources for reference signal transmission, the configuration including a set of uplink transmit power levels and a set of time and frequency resources, transmit, based on the configuration, a set of uplink reference signals at different power levels, receive from the first base station, based on transmitting the multiple uplink reference signals, an instruction to perform a handover to a second base station, the instruction including an indication of a selected uplink reference signal of the multiple uplink reference signals and a power parameter associated with the indicated uplink reference signal, and perform the handover to the second base station based on the instruction. The UE communications manager 515 may be an example of aspects of the UE communications manager 810 described herein.

The UE communications manager 515, or its sub-components, may be implemented in hardware, code (such as, software or firmware) executed by a processor, or any combination thereof. If implemented in code executed by a processor, the functions of the UE communications manager 515, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some implementations, the UE communications manager 515, or its sub-components, may be a separate and distinct component. In some implementations, the UE communications manager 515, or its sub-components, may be combined with one or more other hardware components, including but not limited to an input/output (I/O) component, a transceiver, a network server, another computing device, one or more other components described, or a combination thereof.

The transmitter 520 may transmit signals generated by other components of the device 505. In some implementations, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some cases, the UE communications manager 515 may be implemented by a wireless modem chipset, and the receiver 510 and the transmitter 520 may include analog components, such as amplifiers, filters, phase shifters, and the like, controlled by the UE communications manager 515 to enable receiving and transmitting wireless communications over one or more wireless channels within one or more wireless bands. The UE communications manager 515 may output signals to the transmitter 520 over a transmitter interface for transmission over a wireless channel. Similarly, the UE communications manager 515 may obtain signals received over a wireless channel from the receiver 510 over a receiver interface.

Figure 6:
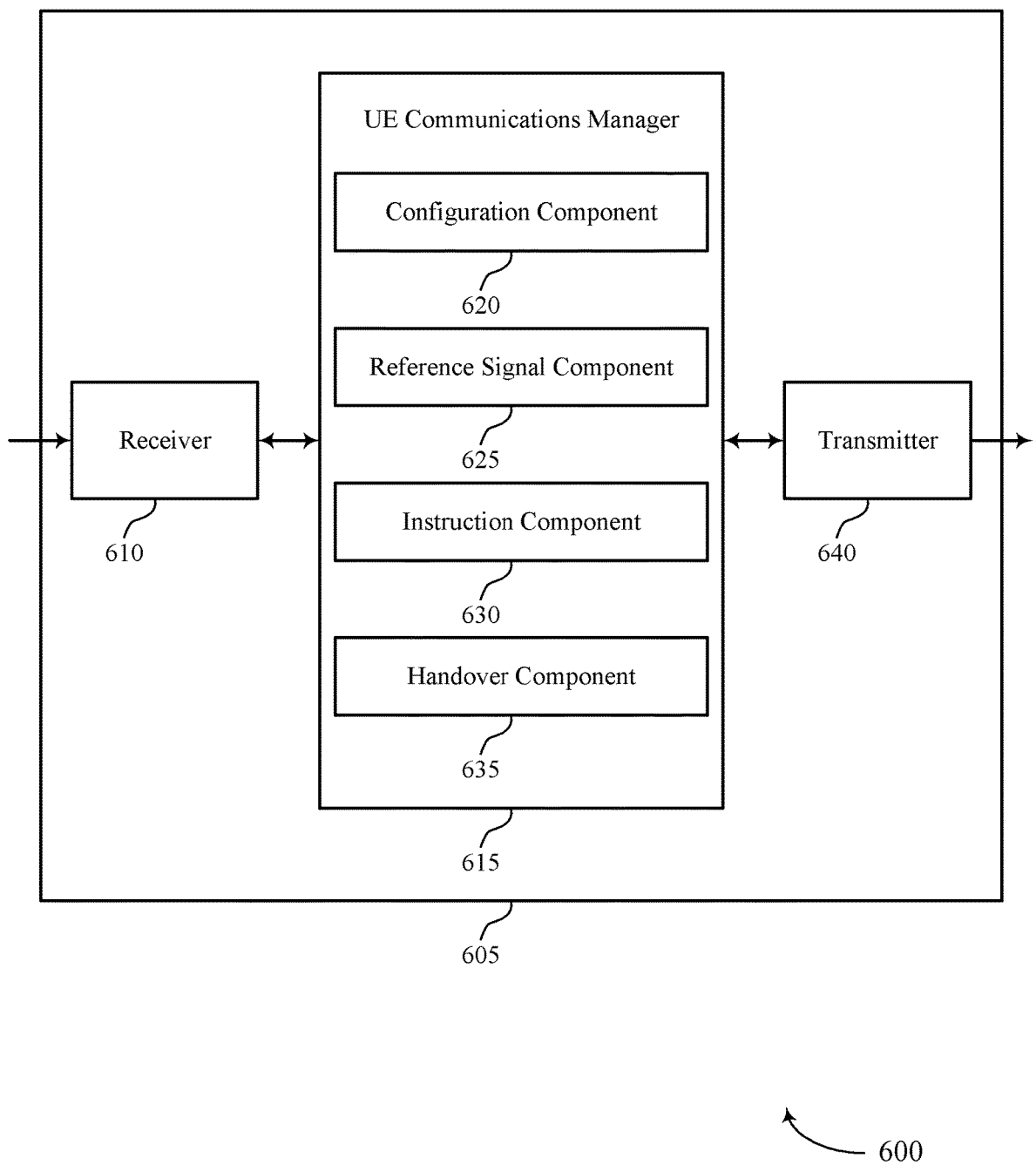

FIG. 6 shows a block diagram 600 of an example device 605 that supports fast UE handover between base stations. The device 605 may be an example of aspects of a device 505, or a UE 115 as described herein. The device 605 may include a receiver 610, a UE communications manager 615, and a transmitter 640. The device 605 may also include a processor. Each of these components may be in communication with one another (such as, via one or more buses).

The receiver 610 may receive information such as packets, user data, or control information associated with various information channels (such as, control channels, data channels, and information related to fast user equipment handover between base stations, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a configuration component 620, a reference signal component 625, an instruction component 630, and a handover component 635. The UE communications manager 615 may be an example of aspects of the UE communications manager 810 described herein.

The configuration component 620 may receive, from a first base station, a configuration of resources for reference signal transmission, the configuration including a set of uplink transmit power levels and a set of time and frequency resources.

The reference signal component 625 may transmit, based on the configuration, a set of uplink reference signals at different power levels.

The instruction component 630 may receive from the first base station, based on transmitting the multiple uplink reference signals, an instruction to perform a handover to a second base station, the instruction including an indication of a selected uplink reference signal of the multiple uplink reference signals and a power parameter associated with the indicated uplink reference signal.

The handover component 635 may perform the handover to the second base station based on the instruction.

The transmitter 640 may transmit signals generated by other components of the device 605. In some implementations, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
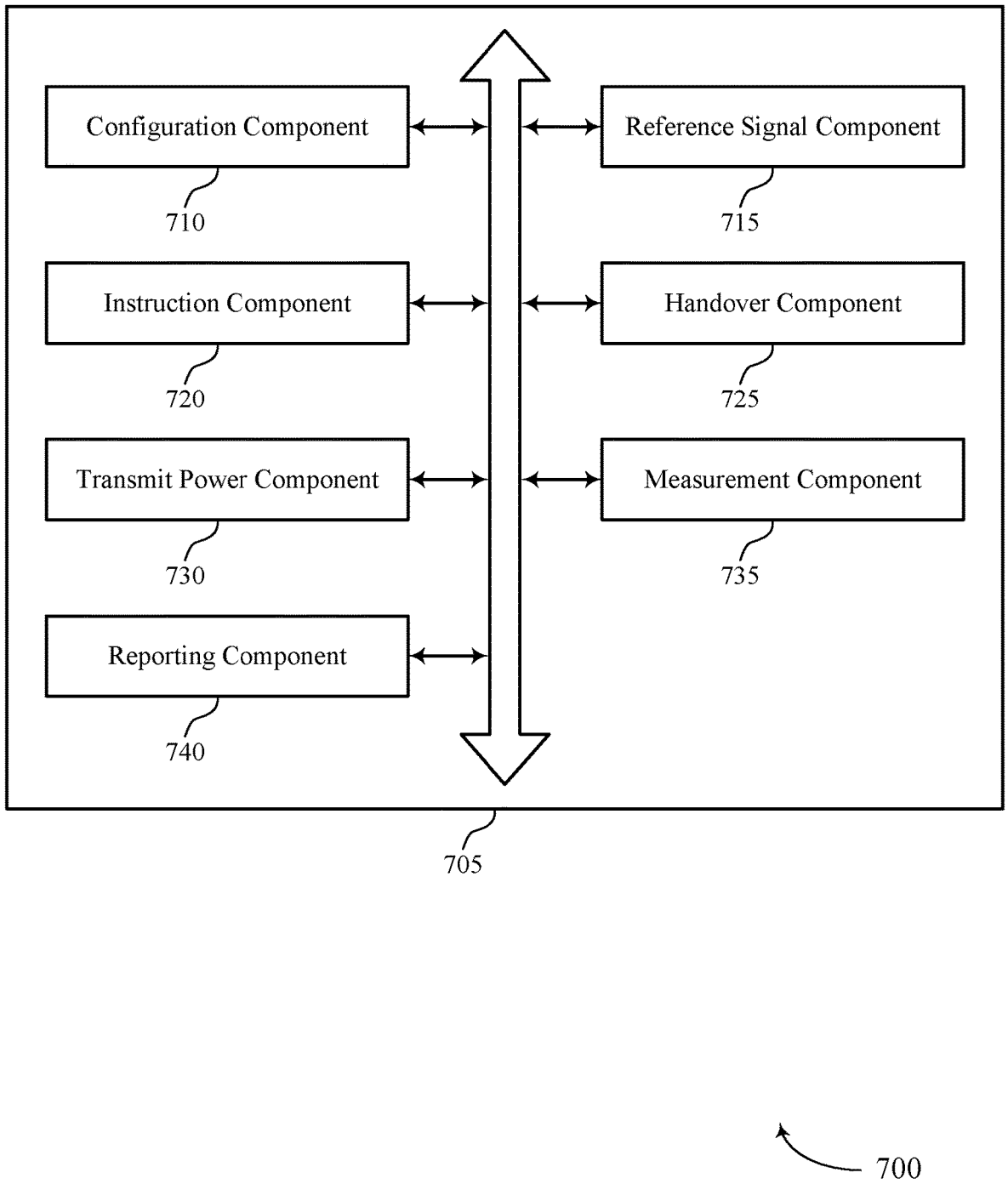
FIG. 7 shows a block diagram of an example UE communications manager that supports fast UE handover between base stations.

FIG. 7 shows a block diagram 700 of a UE communications manager 705 that supports fast UE handover between base stations. The UE communications manager 705 may be an example of aspects of a UE communications manager 515, a UE communications manager 615, or a UE communications manager 810 described herein. The UE communications manager 705 may include a configuration component 710, a reference signal component 715, an instruction component 720, a handover component 725, a transmit power component 730, a measurement component 735, and a reporting component 740. Each of these modules may communicate, directly or indirectly, with one another (such as, via one or more buses).

The configuration component 710 may receive, from a first base station, a configuration of resources for reference signal transmission, the configuration including a set of uplink transmit power levels and a set of time and frequency resources.

The reference signal component 715 may transmit, based on the configuration, a set of uplink reference signals at different power levels. In some implementations, the multiple uplink reference signals include sounding reference signal repetitions.

The instruction component 720 may receive from the first base station, based on transmitting the multiple uplink reference signals, an instruction to perform a handover to a second base station, the instruction including an indication of a selected uplink reference signal of the multiple uplink reference signals and a power parameter associated with the indicated uplink reference signal.

In some implementations, the power parameter includes a power correction value. In some implementations, the instruction further includes one or more of a timing advance value or an uplink grant. In some implementations, the instruction further includes a set of parameters including the power parameter and one or more of the timing advance value or the uplink grant.

The handover component 725 may perform the handover to the second base station based on the instruction.

In some implementations, the handover component 725 may transmit, to the second base station, a handover complete message at the uplink transmit power. In some implementations, the handover component 725 may transmit, to the second base station, a first random access message of a random access procedure at the uplink transmit power. In some implementations, the handover component 725 may transmit, to the second base station, a second random access message of the random access procedure at a second uplink transmit power, the second random access message including a retransmission of the first random access message. In some implementations, the handover component 725 may transmit the second random access message of the random access procedure at a second uplink transmit power where the second uplink transmit power is higher than the uplink transmit power.

The transmit power component 730 may determine an uplink transmit power for transmission to the second base station based on the selected uplink reference signal and the power parameter.

The measurement component 735 may determine, based on a measured signal quality, a measurement event.

The reporting component 740 may transmit, to the first base station, a measurement report based on the measurement event. In some implementations, the reporting component 740 may identify a set of uplink transmit power levels, where the set of uplink transmit power levels is based on the measurement report.

Figure 8:
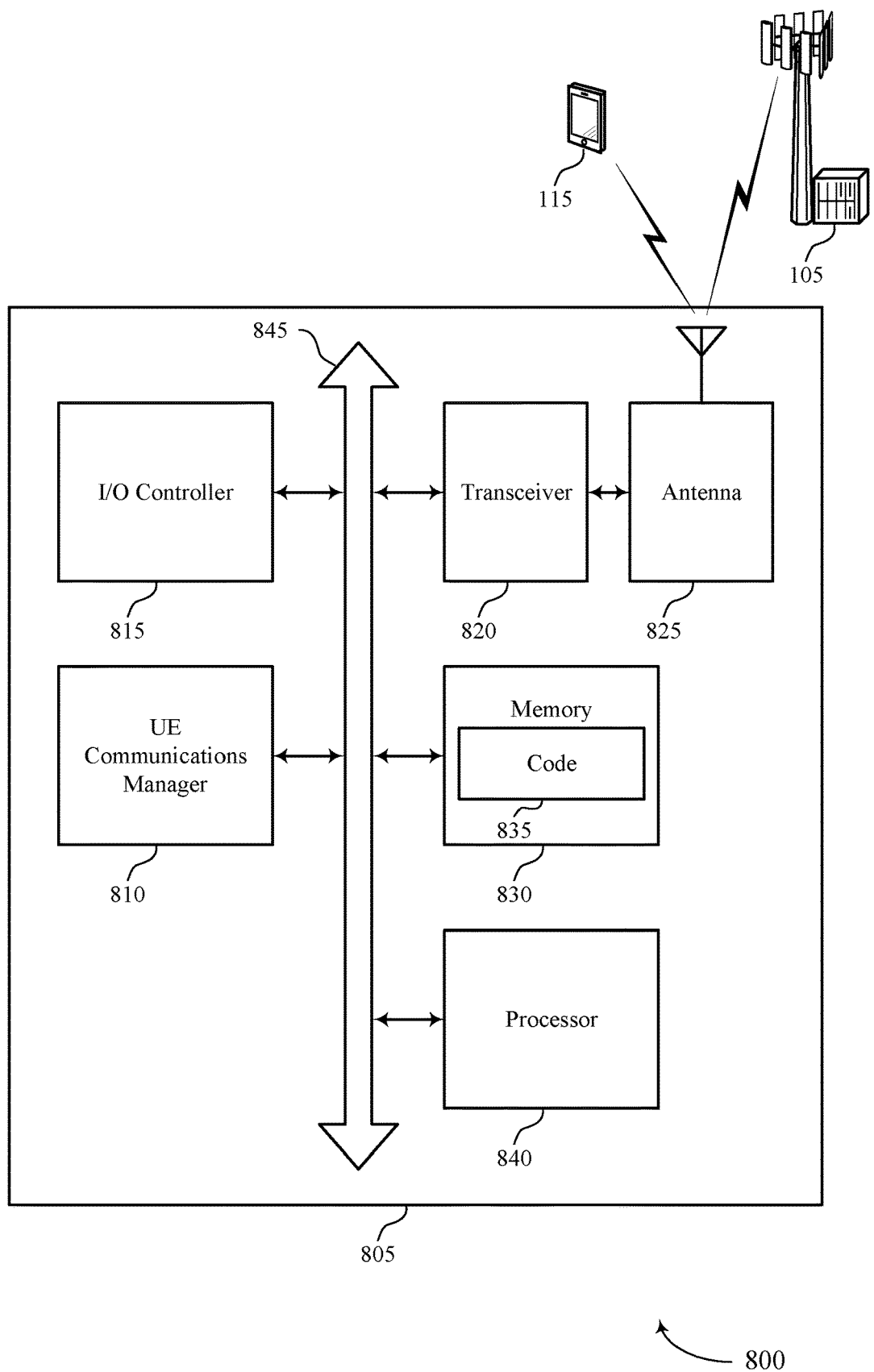
FIG. 8 shows a diagram of an example system including a device that supports fast UE handover between base stations.

FIG. 8 shows a diagram of a system 800 including an example device 805 that supports fast UE handover between base stations. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (such as, bus 845).

The UE communications manager 810 may receive, from a first base station, a configuration of resources for reference signal transmission, the configuration including a set of uplink transmit power levels and a set of time and frequency resources, transmit, based on the configuration, a set of uplink reference signals at different power levels, receive from the first base station, based on transmitting the multiple uplink reference signals, an instruction to perform a handover to a second base station, the instruction including an indication of a selected uplink reference signal of the multiple uplink reference signals and a power parameter associated with the indicated uplink reference signal, and perform the handover to the second base station based on the instruction.

The I/O controller 815 may manage input and output signals for the device 805. The I/O controller 815 may also manage peripherals not integrated into the device 805. In some implementations, the I/O controller 815 may represent a physical connection or port to an external peripheral. In some implementations, the I/O controller 815 may utilize an operating system such as iOS®, ANDROID®, MS-DOS®, MS-WINDOWS®, OS/2®, UNIX®, LINUX®, or another known operating system. In some other implementations, the I/O controller 815 may represent or interact with a modem, a keyboard, a mouse, a touchscreen, or a similar device. In some implementations, the I/O controller 815 may be implemented as part of a processor. In some implementations, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some implementations, the wireless device may include a single antenna 825. However, in some implementations the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some implementations, the memory 830 may contain, among other things, a basic input/output system (BIOS) which may control basic hardware or software operation such as the interaction with peripheral components or devices.

The processor 840 may include an intelligent hardware device, (such as, a general-purpose processor, a DSP, a CPU, a microcontroller, an ASIC, an FPGA, a programmable logic device, a discrete gate or transistor logic component, a discrete hardware component, or any combination thereof). In some implementations, the processor 840 may be configured to operate a memory array using a memory controller. In some other implementations, a memory controller may be integrated into the processor 840. The processor 840 may be configured to execute computer-readable instructions stored in a memory (such as, the memory 830) to cause the device 805 to perform various functions (such as, functions or tasks supporting fast user equipment handover between base stations).

The code 835 may include instructions to implement aspects of the present disclosure, including instructions to support wireless communications. The code 835 may be stored in a non-transitory computer-readable medium such as system memory or other type of memory. In some implementations, the code 835 may not be directly executable by the processor 840 but may cause a computer (such as, when compiled and executed) to perform functions described herein.

Figure 9:
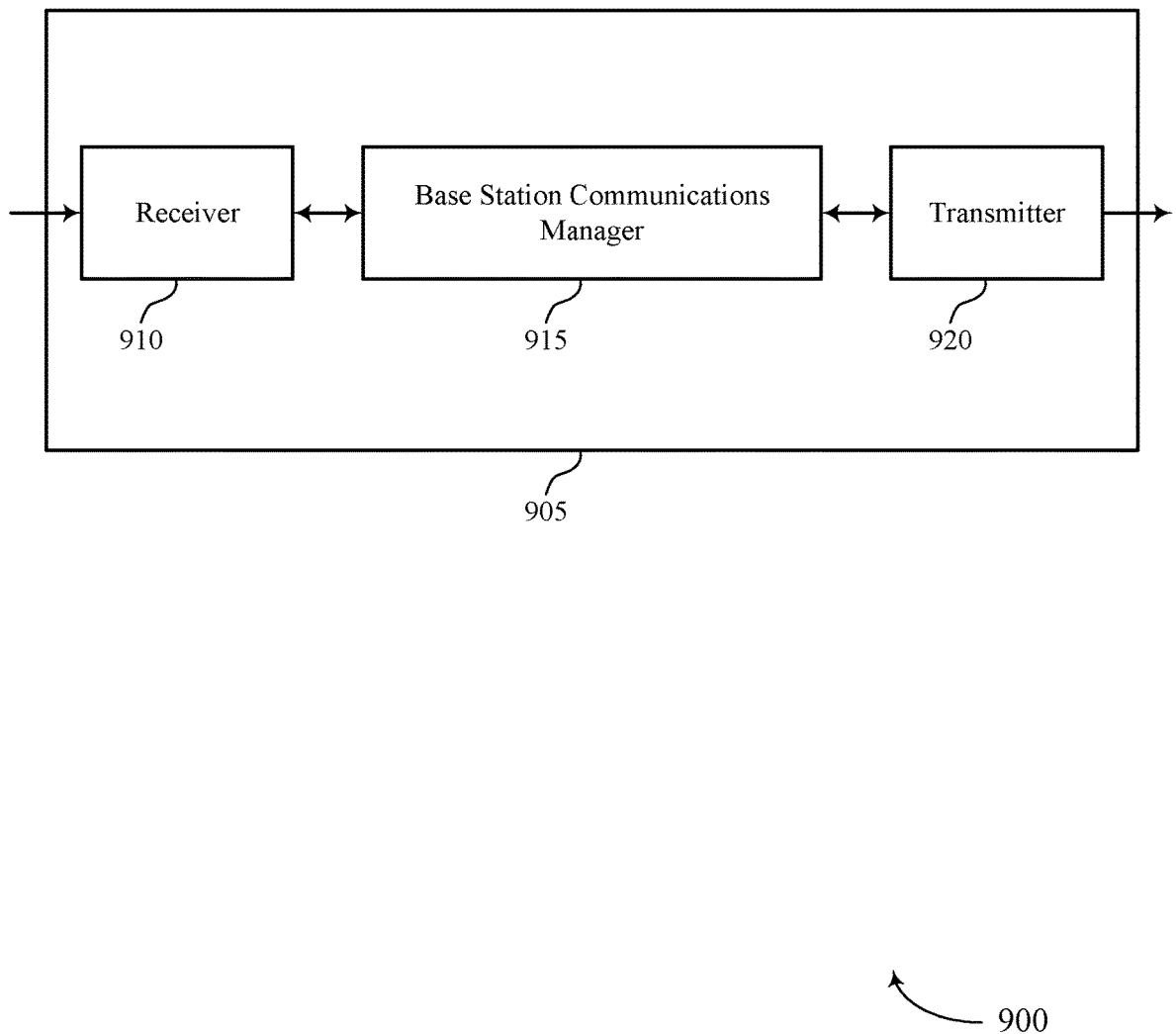
FIGS. 9 and 10 show block diagrams of example devices that support fast UE handover between base stations.

FIG. 9 shows a block diagram 900 of an example device 905 that supports fast UE handover between base stations. The device 905 may be an example of aspects of a base station 105, including a source base station or a target base station, as described herein. The device 905 may include a receiver 910, a base station communications manager 915, and a transmitter 920. The device 905 may also include a processor. Each of these components may be in communication with one another (such as, via one or more buses).

The receiver 910 may receive information such as packets, user data, or control information associated with various information channels (such as, control channels, data channels, and information related to fast user equipment handover between base stations, etc.). Information may be passed on to other components of the device 905. The receiver 910 may be an example of aspects of the transceiver 1220 described with reference to FIG. 12. The receiver 910 may utilize a single antenna or a set of antennas.

In some implementations, the base station communications manager 915 may transmit, to a UE, a configuration of resources for reference signal transmission, the configuration including a set of uplink transmit power levels and a set of time and frequency resources, transmit, to a second base station, a first message including an indication of a set of uplink reference signals to measure from the UE, receive, from the second base station, a second message in response to the first message, the second message including a selected uplink reference signal of the set of uplink reference signals and a power parameter, and transmit, to the UE, an instruction to perform a handover to the second base station, the instruction including an indication of the selected uplink reference signal and the power parameter as part of a command for the handover to the second base station.

In some other implementations, the base station communications manager 915 may receive, from a first base station, a first message including an indication of a set of uplink reference signals to measure from a UE, select, based on the receiving, an uplink reference signal of the set of uplink reference signals, determine a power parameter based on the selecting of the uplink reference signal, and transmit, to the first base station, a second message in response to the first message, the second message including the selected uplink reference signal and the power parameter. The base station communications manager 915 may be an example of aspects of the base station communications manager 1210 described herein.

The base station communications manager 915, or its sub-components, may be implemented in hardware, code (such as, software or firmware) executed by a processor, or any combination thereof. If implemented in code executed by a processor, the functions of the base station communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some implementations, the base station communications manager 915, or its sub-components, may be a separate and distinct component. In some implementations, the base station communications manager 915, or its sub-components, may be combined with one or more other hardware components, including but not limited to an input/output (I/O) component, a transceiver, a network server, another computing device, one or more other components described, or a combination thereof.

The transmitter 920 may transmit signals generated by other components of the device 905. In some implementations, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

In some cases, the base station communications manager 915 may be implemented by a wireless modem chipset, and the receiver 910 and the transmitter 920 may include analog components, such as amplifiers, filters, phase shifters, and the like, controlled by the base station communications manager 915 to enable receiving and transmitting wireless communications over one or more wireless channels within one or more wireless bands. The base station communications manager 915 may output signals to the transmitter 920 over a transmitter interface for transmission over a wireless channel. Similarly, the base station communications manager 915 may obtain signals received over a wireless channel from the receiver 905 over a receiver interface.

Figure 10:
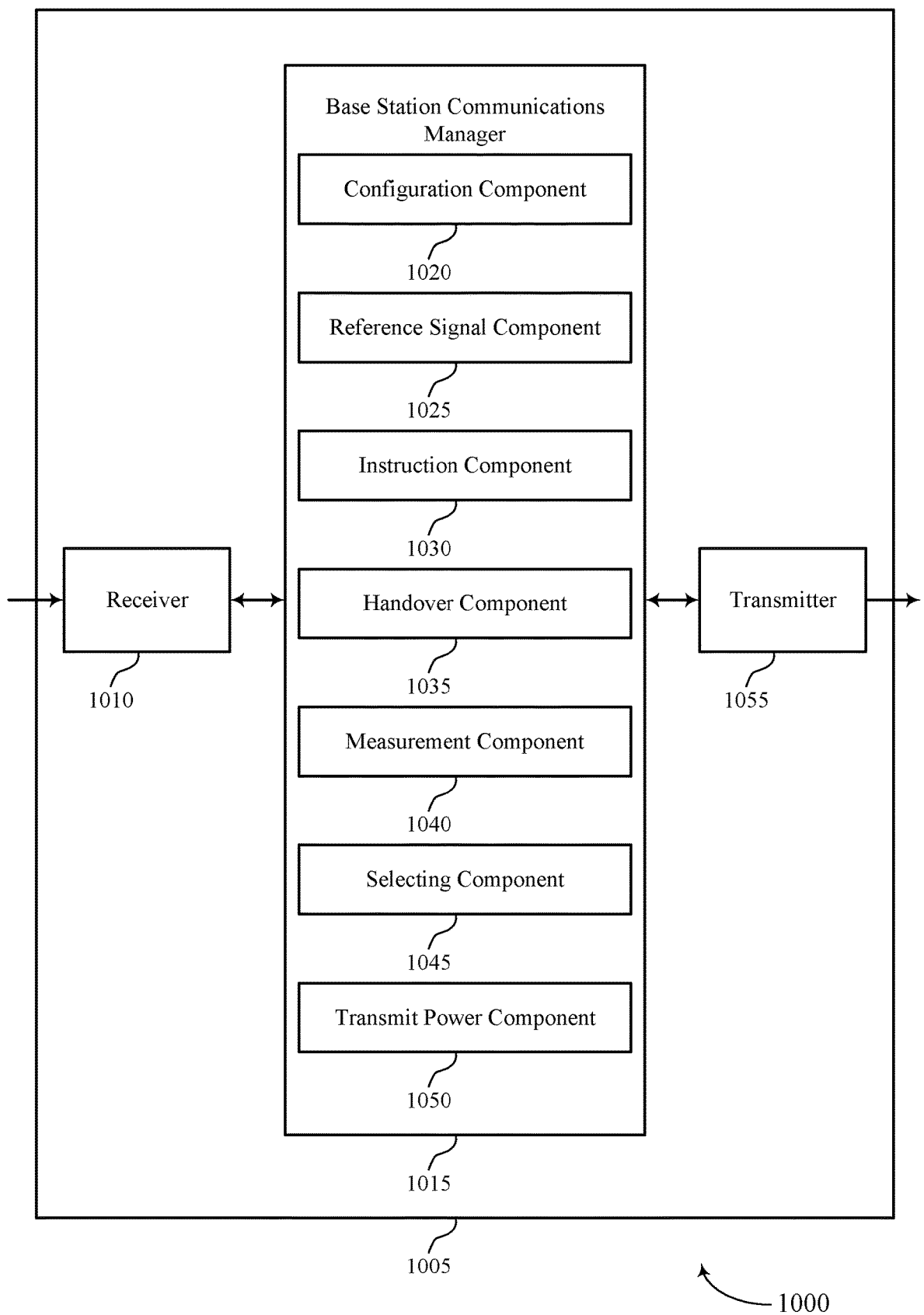

FIG. 10 shows a block diagram 1000 of an example device 1005 that supports fast UE handover between base stations. The device 1005 may be an example of aspects of a device 905, or a base station 105 as described herein. The device 1005 may include a receiver 1010, a base station communications manager 1015, and a transmitter 1055. The device 1005 may also include a processor. Each of these components may be in communication with one another (such as, via one or more buses).

The receiver 1010 may receive information such as packets, user data, or control information associated with various information channels (such as, control channels, data channels, and information related to fast user equipment handover between base stations, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a configuration component 1020, a reference signal component 1025, an instruction component 1030, a handover component 1035, a measurement component 1040, a selecting component 1045, and a transmit power component 1050. The base station communications manager 1015 may be an example of aspects of the base station communications manager 1210 described herein.

The configuration component 1020 may transmit, to a UE, a configuration of resources for reference signal transmission, the configuration including a set of uplink transmit power levels and a set of time and frequency resources.

The reference signal component 1025 may transmit, to an (alternative) second base station, a first message including an indication of a set of uplink reference signals to measure from the UE.

In some implementations, the instruction component 1030 may receive, from the second base station, a second message in response to the first message, the second message including a selected uplink reference signal of the set of uplink reference signals and a power parameter. In some other implementations, the instruction component 1030 may transmit, to the first base station, a second message in response to the first message, the second message including the uplink reference signal and the power parameter.

The handover component 1035 may transmit, to the UE, an instruction to perform a handover to the second base station, the instruction including an indication of the selected uplink reference signal and the power parameter as part of a command for the handover to the second base station.

The measurement component 1040 may receive, from an (alternative) first base station, a first message including an indication of a set of uplink reference signals to measure from the UE.

The selecting component 1045 may select, based on the receiving, an uplink reference signal of the set of uplink reference signals.

The transmit power component 1050 may determine a power parameter based on the selecting of the uplink reference signal.

The transmitter 1055 may transmit signals generated by other components of the device 1005. In some implementations, the transmitter 1055 may be collocated with a receiver 1010 in a transceiver module. For example, the transmitter 1055 may be an example of aspects of the transceiver 1220 described with reference to FIG. 12. The transmitter 1055 may utilize a single antenna or a set of antennas.

Figure 11:
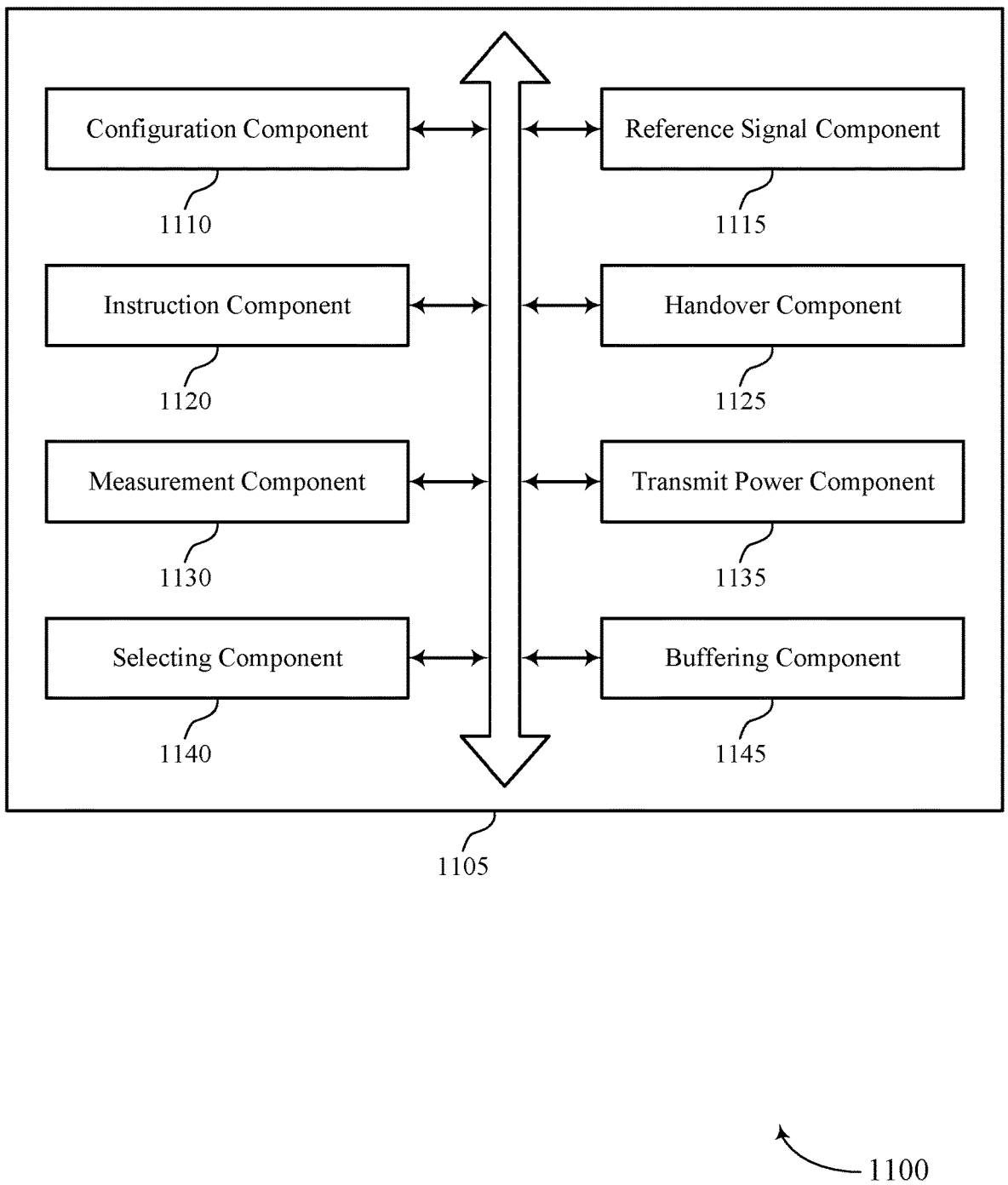
FIG. 11 shows a block diagram of an example base station communications manager that supports fast UE handover between base stations.

FIG. 11 shows a block diagram 1100 of a base station communications manager 1105 that supports fast UE handover between base stations. The base station communications manager 1105 may be an example of aspects of a base station communications manager 915, a base station communications manager 1015, or a base station communications manager 1210 described herein. The base station communications manager 1105 may include a configuration component 1110, a reference signal component 1115, an instruction component 1120, a handover component 1125, a measurement component 1130, a transmit power component 1135, a selecting component 1140, and a buffering component 1145. Each of these modules may communicate, directly or indirectly, with one another (such as, via one or more buses).

The configuration component 1110 may transmit, to a UE, a configuration of resources for reference signal transmission, the configuration including a set of uplink transmit power levels and a set of time and frequency resources.

The reference signal component 1115 may transmit, to an (alternative) second base station, a first message including an indication of a set of uplink reference signals to measure from the UE. In some implementations, the multiple uplink reference signals include sounding reference signal repetitions.

In some implementations, the instruction component 1120 may receive, from the second base station, a second message in response to the first message, the second message including a selected uplink reference signal of the set of uplink reference signals and a power parameter.

In some other implementations, the instruction component 1120 may transmit, to an (alternative) first base station, a second message in response to the first message, the second message including the uplink reference signal and the power parameter. In some implementations, the instruction component 1120 may determine one or more of a timing advance value or an uplink grant. In some implementations, the instruction component 1120 may transmit the timing advance value or the uplink grant as part of the second message. In some implementations, the power parameter includes a power correction value.

The handover component 1125 may transmit, to the UE, an instruction to perform a handover to the second base station, the instruction including an indication of the selected uplink reference signal and the power parameter as part of a command for the handover to the second base station.

In some implementations, the handover component 1125 may receive, from the UE, a handover complete message based on the transmitting. In some implementations, the handover component 1125 may receive, from the UE, a first random access message of a random access procedure based on the transmitting. In some implementations, the handover component 1125 may receive, from the UE, a second random access message of the random access procedure, the second random access message including a retransmission of the first random access message at a higher uplink transmit power, where receiving the second random access message is based on an inability to decode the first random access message.

The measurement component 1130 may receive, from a first base station, a first message including an indication of a set of uplink reference signals to measure from the UE. In some implementations, the measurement component 1130 may receive, from the UE, a measurement report based on a measurement event. In some implementations, the measurement component 1130 may identify the second base station based on the measurement report.

The transmit power component 1135 may determine a power parameter based on the selecting of the uplink reference signal. In some implementations, the transmit power component 1135 may determine the set of uplink transmit power levels is based on the measurement report.

The selecting component 1140 may select, based on the receiving, an uplink reference signal of the set of uplink reference signals. In some implementations, the selecting component 1140 may select the second base station for handover based on the receiving. In some implementations, the multiple uplink reference signals include sounding reference signal repetitions.

The buffering component 1145 may receive, from the first base station, a forwarding of user data for the UE based on a handover of service. In some implementations, the buffering component 1145 may buffer the user data for the UE based on the receiving.

Figure 12:
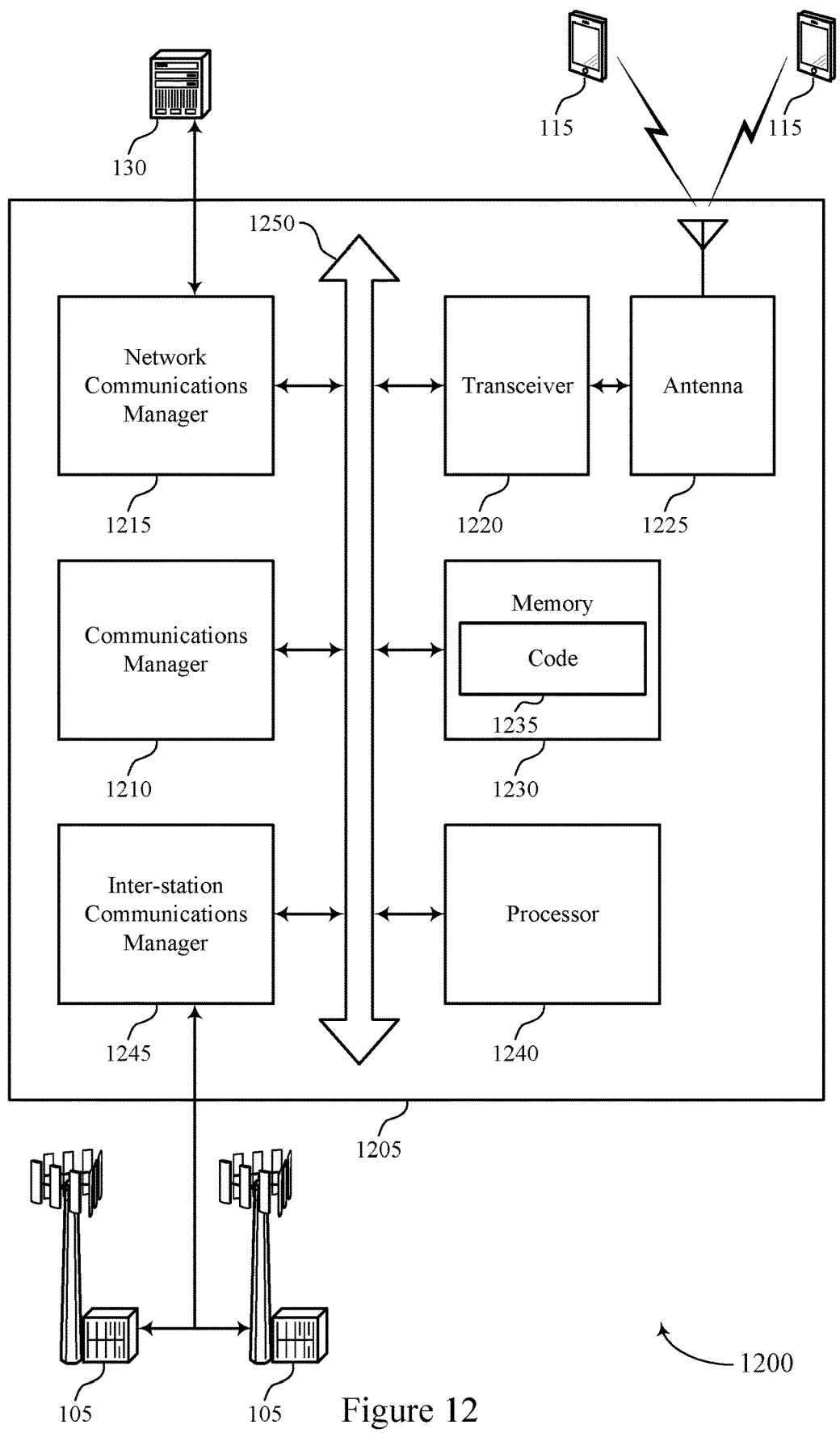
FIG. 12 shows a diagram of an example system including a device that supports fast UE handover between base stations.

FIG. 12 shows a diagram of a system 1200 including an example device 1205 that supports fast UE handover between base stations. The device 1205 may be an example of or include the components of device 905, device 1005, or a base station 105 as described herein. The device 1205 may include components for bi-directional voice and data communications including components for transmitting and receiving communications, including a base station communications manager 1210, a network base station communications manager 1215, a transceiver 1220, an antenna 1225, memory 1230, a processor 1240, and an inter-station base station communications manager 1245. These components may be in electronic communication via one or more buses (such as, bus 1250).

In some implementations, the base station communications manager 1210 may transmit, to a UE, a configuration of resources for reference signal transmission, the configuration including a set of uplink transmit power levels and a set of time and frequency resources, transmit, to a second base station, a first message including an indication of a set of uplink reference signals to measure from the UE, receive, from the second base station, a second message in response to the first message, the second message including a selected uplink reference signal of the set of uplink reference signals and a power parameter, and transmit, to the UE, an instruction to perform a handover to the second base station, the instruction including an indication of the selected uplink reference signal and the power parameter as part of a command for the handover to the second base station.

In some other implementations, the base station communications manager 1210 may receive, from a first base station, a first message including an indication of a set of uplink reference signals to measure from a UE, select, based on the receiving, an uplink reference signal of the set of uplink reference signals, determine a power parameter based on the selecting of the uplink reference signal, and transmit, to the first base station, a second message in response to the first message, the second message including the selected uplink reference signal and the power parameter.

The network communications manager 1215 may manage communications with the core network (such as, via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some implementations, the wireless device may include a single antenna 1225. However, In some implementations the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (such as, the processor 1240) cause the device to perform various functions described herein. In some implementations, the memory 1230 may contain, among other things, a BIOS which may control basic hardware or software operation such as the interaction with peripheral components or devices.

The processor 1240 may include an intelligent hardware device, (such as, a general-purpose processor, a DSP, a CPU, a microcontroller, an ASIC, an FPGA, a programmable logic device, a discrete gate or transistor logic component, a discrete hardware component, or any combination thereof). In some implementations, the processor 1240 may be configured to operate a memory array using a memory controller. In some implementations, a memory controller may be integrated into processor 1240. The processor 1240 may be configured to execute computer-readable instructions stored in a memory (such as, the memory 1230) to cause the device 1205 to perform various functions (such as, functions or tasks supporting fast user equipment handover between base stations).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some implementations, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some implementations, the code 1235 may not be directly executable by the processor 1240 but may cause a computer (such as, when compiled and executed) to perform functions described herein.

Figure 13:
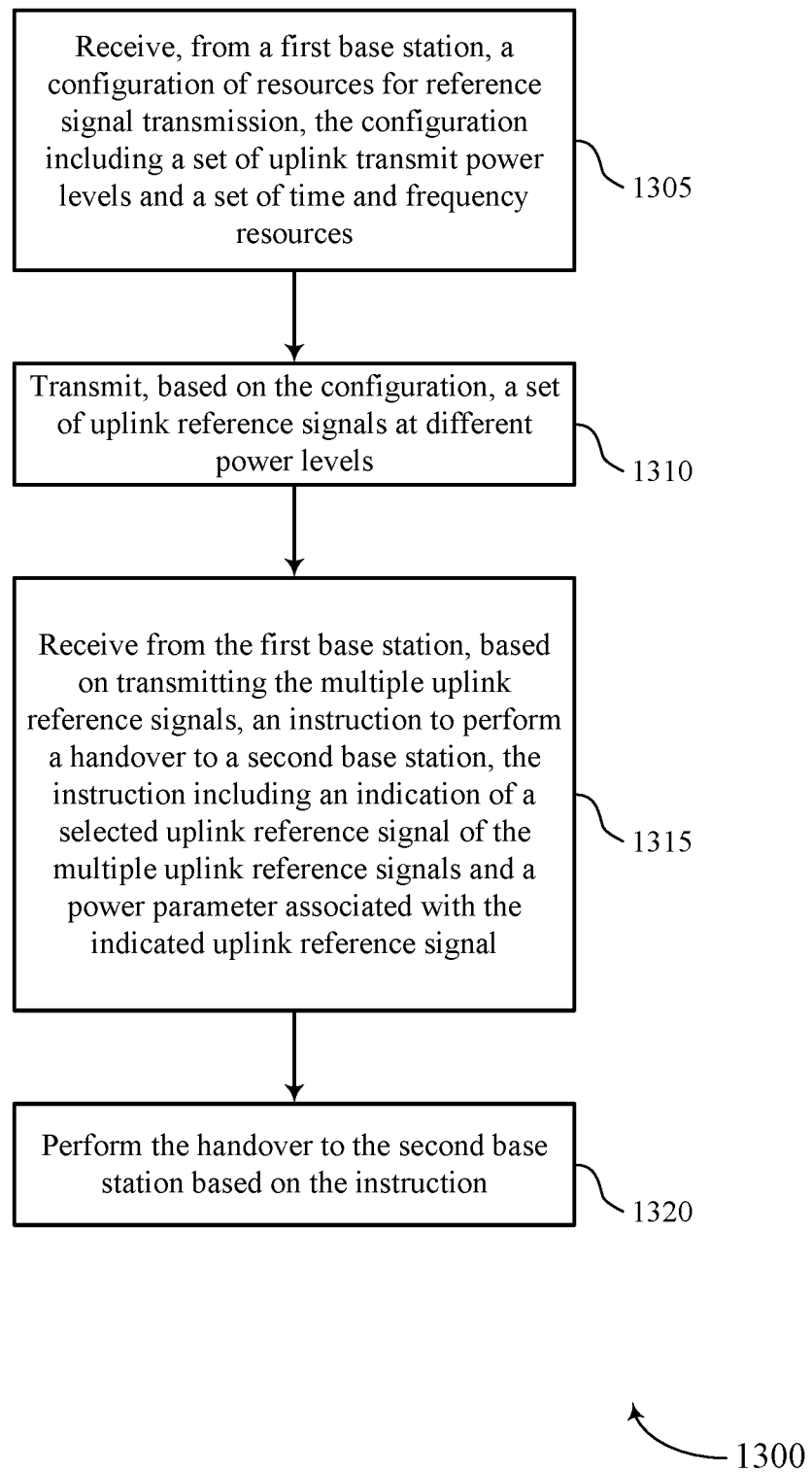
FIGS. 13 through 16 show flowcharts illustrating example methods that support fast UE handover between base stations.

FIG. 13 shows a flowchart illustrating an example method 1300 that supports fast UE handover between base stations. The operations of method 1300 may be implemented by a UE 115 or its components as described herein. For example, the operations of method 1300 may be performed by a communications manager as described with reference to FIGS. 5 through 8. In some implementations, a UE may execute a set of instructions to control the functional elements of the UE to perform the functions described below. Additionally, or alternatively, a UE may perform aspects of the functions described below using special-purpose hardware.

At 1305, the UE may receive, from a first base station, a configuration of resources for reference signal transmission, the configuration including a set of uplink transmit power levels and a set of time and frequency resources. The operations of 1305 may be performed according to the methods described herein. In some implementations, aspects of the operations of 1305 may be performed by a configuration component as described with reference to FIGS. 5 through 8.

At 1310, the UE may transmit, based on the configuration, a set of uplink reference signals at different power levels. The operations of 1310 may be performed according to the methods described herein. In some implementations, aspects of the operations of 1310 may be performed by a reference signal component as described with reference to FIGS. 5 through 8.

At 1315, the UE may receive from the first base station, based on transmitting the multiple uplink reference signals, an instruction to perform a handover to a second base station, the instruction including an indication of a selected uplink reference signal of the multiple uplink reference signals and a power parameter associated with the indicated uplink reference signal. The operations of 1315 may be performed according to the methods described herein. In some implementations, aspects of the operations of 1315 may be performed by an instruction component as described with reference to FIGS. 5 through 8.

At 1320, the UE may perform the handover to the second base station based on the instruction. The operations of 1320 may be performed according to the methods described herein. In some implementations, aspects of the operations of 1320 may be performed by a handover component as described with reference to FIGS. 5 through 8.

Figure 14:
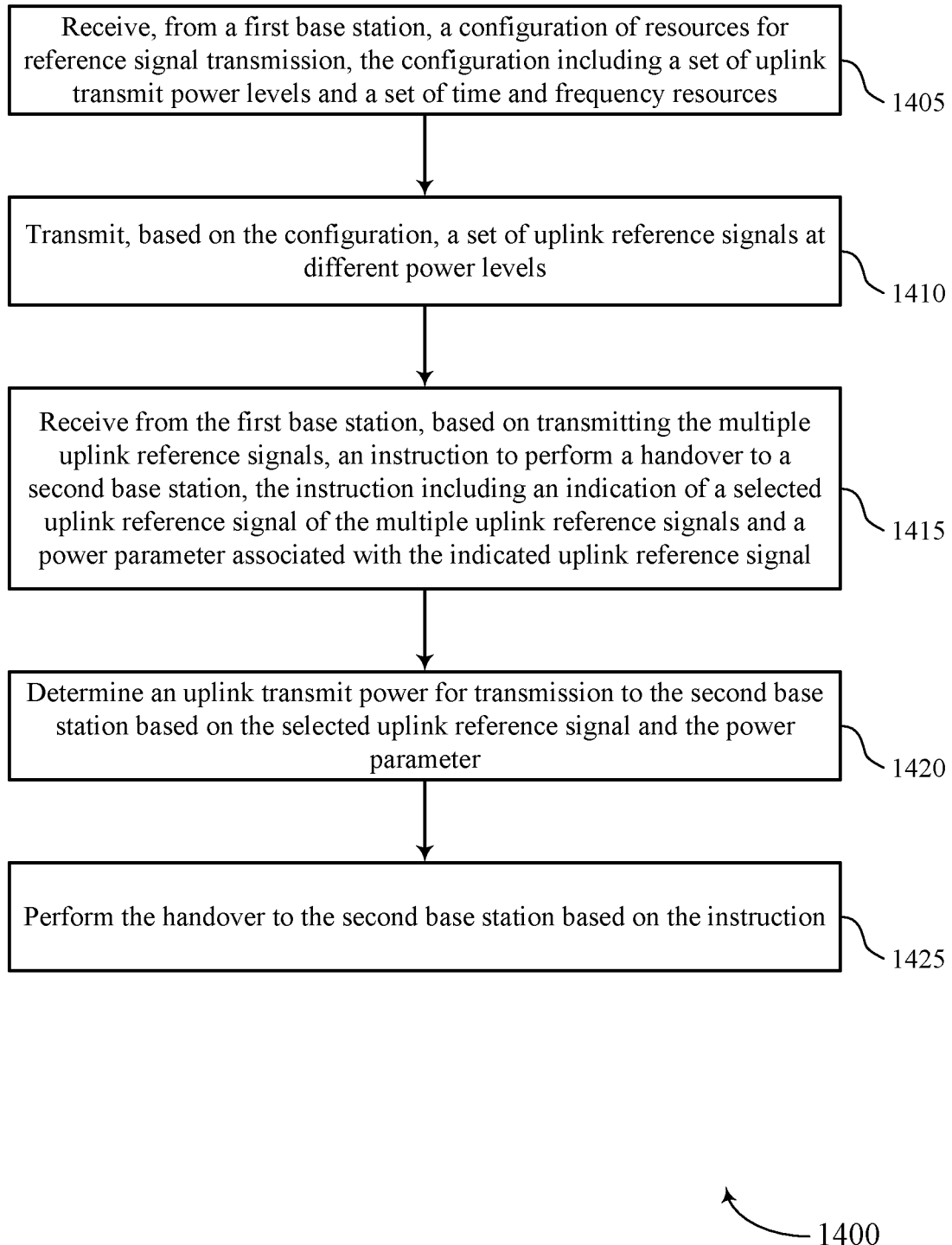

FIG. 14 shows a flowchart illustrating an example method 1400 that supports fast UE handover between base stations. The operations of method 1400 may be implemented by a UE 115 or its components as described herein. For example, the operations of method 1400 may be performed by a communications manager as described with reference to FIGS. 5 through 8. In some implementations, a UE may execute a set of instructions to control the functional elements of the UE to perform the functions described below. Additionally, or alternatively, a UE may perform aspects of the functions described below using special-purpose hardware.

At 1405, the UE may receive, from a first base station, a configuration of resources for reference signal transmission, the configuration including a set of uplink transmit power levels and a set of time and frequency resources. The operations of 1405 may be performed according to the methods described herein. In some implementations, aspects of the operations of 1405 may be performed by a configuration component as described with reference to FIGS. 5 through 8.

At 1410, the UE may transmit, based on the configuration, a set of uplink reference signals at different power levels. The operations of 1410 may be performed according to the methods described herein. In some implementations, aspects of the operations of 1410 may be performed by a reference signal component as described with reference to FIGS. 5 through 8.

At 1415, the UE may receive from the first base station, based on transmitting the multiple uplink reference signals, an instruction to perform a handover to a second base station, the instruction including an indication of a selected uplink reference signal of the multiple uplink reference signals and a power parameter associated with the indicated uplink reference signal. The operations of 1415 may be performed according to the methods described herein. In some implementations, aspects of the operations of 1415 may be performed by an instruction component as described with reference to FIGS. 5 through 8.

At 1420, the UE may determine an uplink transmit power for transmission to the second base station based on the selected uplink reference signal and the power parameter. The operations of 1420 may be performed according to the methods described herein. In some implementations, aspects of the operations of 1420 may be performed by a transmit power component as described with reference to FIGS. 5 through 8.

At 1425, the UE may perform the handover to the second base station based on the instruction. The operations of 1425 may be performed according to the methods described herein. In some implementations, aspects of the operations of 1425 may be performed by a handover component as described with reference to FIGS. 5 through 8.

Figure 15:
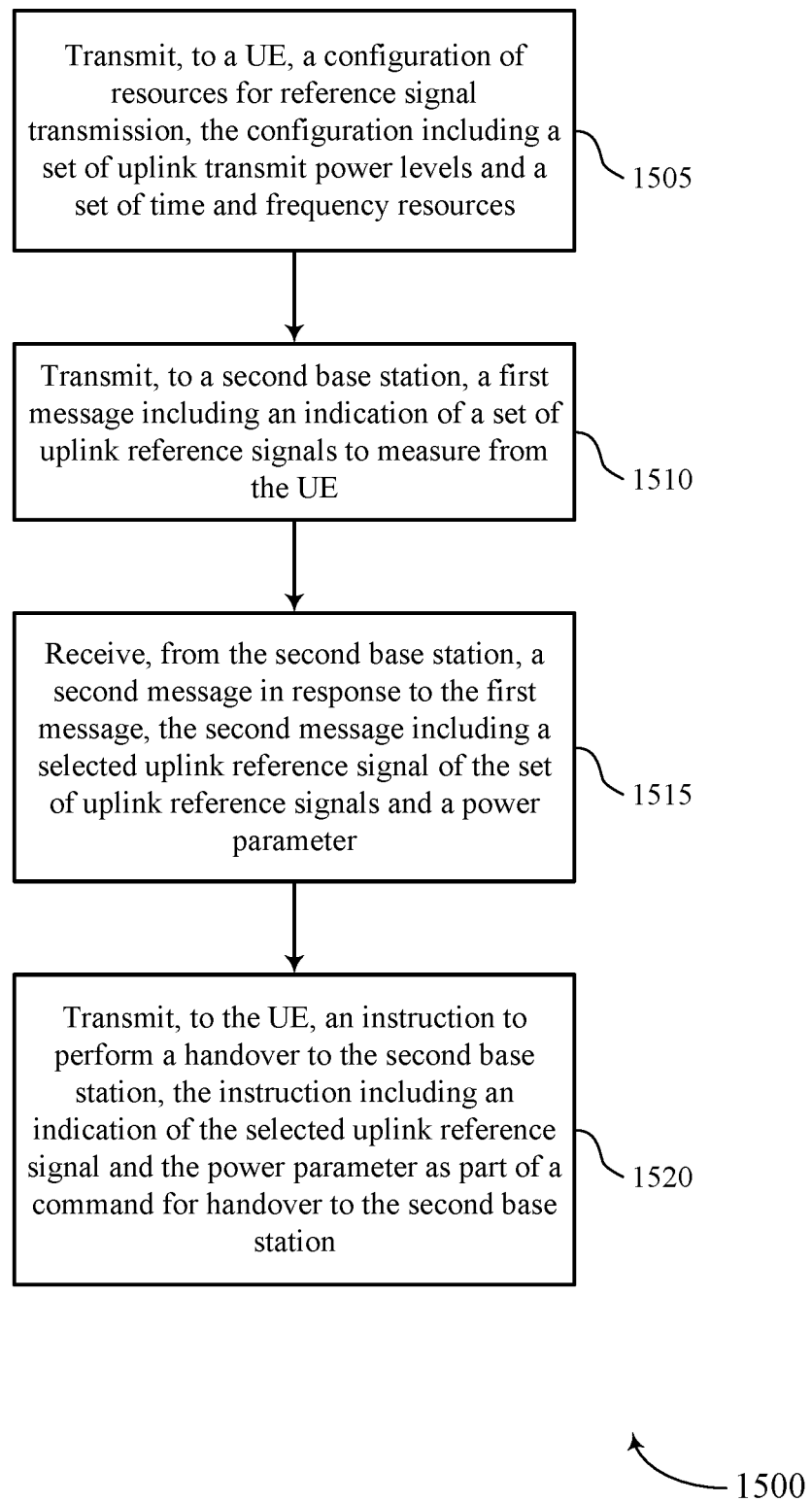

FIG. 15 shows a flowchart illustrating an example method 1500 that supports fast UE handover between base stations. The operations of method 1500 may be implemented by a base station 105 or its components as described herein. For example, the operations of method 1500 may be performed by a communications manager as described with reference to FIGS. 9 through 12. In some implementations, a base station may execute a set of instructions to control the functional elements of the base station to perform the functions described below. Additionally, or alternatively, a base station may perform aspects of the functions described below using special-purpose hardware.

At 1505, the base station may transmit, to a UE, a configuration of resources for reference signal transmission, the configuration including a set of uplink transmit power levels and a set of time and frequency resources. The operations of 1505 may be performed according to the methods described herein. In some implementations, aspects of the operations of 1505 may be performed by a configuration component as described with reference to FIGS. 9 through 12.

At 1510, the base station may transmit, to a second base station, a first message including an indication of a set of uplink reference signals to measure from the UE. The operations of 1510 may be performed according to the methods described herein. In some implementations, aspects of the operations of 1510 may be performed by a reference signal component as described with reference to FIGS. 9 through 12.

At 1515, the base station may receive, from the second base station, a second message in response to the first message, the second message including a selected uplink reference signal of the set of uplink reference signals and a power parameter. The operations of 1515 may be performed according to the methods described herein. In some implementations, aspects of the operations of 1515 may be performed by an instruction component as described with reference to FIGS. 9 through 12.

At 1520, the base station may transmit, to the UE, an instruction to perform a handover to the second base station, the instruction including an indication of the selected uplink reference signal and the power parameter as part of a command for the handover to the second base station. The operations of 1520 may be performed according to the methods described herein. In some implementations, aspects of the operations of 1520 may be performed by a handover component as described with reference to FIGS. 9 through 12.

Figure 16:
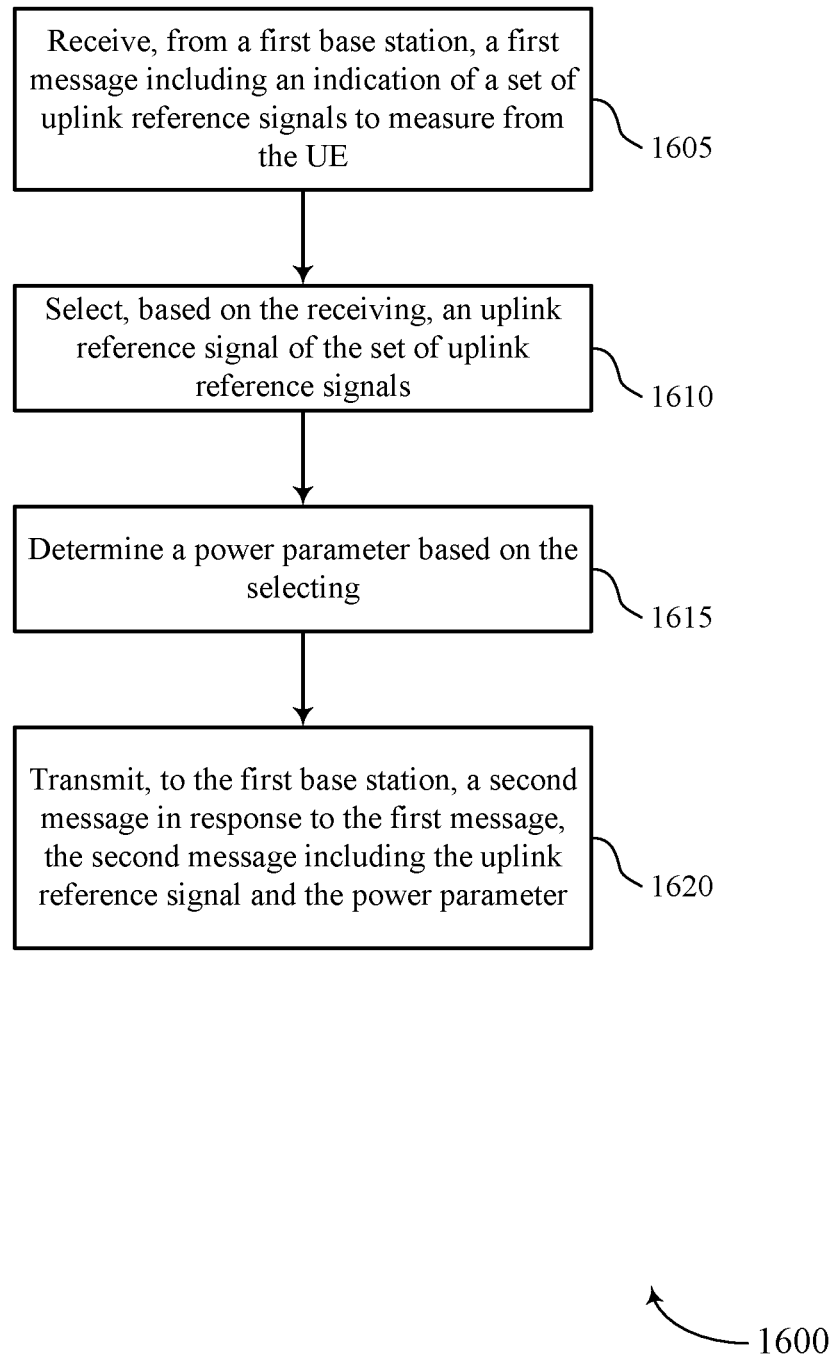

FIG. 16 shows a flowchart illustrating an example method 1600 that supports fast UE handover between base stations. The operations of method 1600 may be implemented by a base station 105 or its components as described herein. For example, the operations of method 1600 may be performed by a communications manager as described with reference to FIGS. 9 through 12. In some implementations, a base station may execute a set of instructions to control the functional elements of the base station to perform the functions described below. Additionally, or alternatively, a base station may perform aspects of the functions described below using special-purpose hardware.

At 1605, the base station may receive, from a first base station, a first message including an indication of a set of uplink reference signals to measure from a UE. The operations of 1605 may be performed according to the methods described herein. In some implementations, aspects of the operations of 1605 may be performed by a measurement component as described with reference to FIGS. 9 through 12.

At 1610, the base station may select, based on the receiving, an uplink reference signal of the set of uplink reference signals. The operations of 1610 may be performed according to the methods described herein. In some implementations, aspects of the operations of 1610 may be performed by a selecting component as described with reference to FIGS. 9 through 12.

At 1615, the base station may determine a power parameter based on the selecting of the uplink reference signal. The operations of 1615 may be performed according to the methods described herein. In some implementations, aspects of the operations of 1615 may be performed by a transmit power component as described with reference to FIGS. 9 through 12.

At 1620, the base station may transmit, to the first base station, a second message in response to the first message, the second message including the selected uplink reference signal and the power parameter. The operations of 1620 may be performed according to the methods described herein. In some implementations, aspects of the operations of 1620 may be performed by an instruction component as described with reference to FIGS. 9 through 12.

An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (such as, several kilometers in radius) and may allow unrestricted access by UEs with service subscriptions with the network provider. A small cell may be associated with a lower-powered base station, as compared with a macro cell, and a small cell may operate in the same or different (such as, licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (such as, a home) and may provide restricted access by UEs having an association with the femto cell (such as, UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (such as, two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

As used herein, including in the claims, "or" as used in a list of items (such as, a list of items prefaced by a phrase such as "at least one of" or "one or more of") indicates an inclusive list such that, for example, a list of at least one of A, B, or C means A or B or C or AB or AC or BC or ABC (such as A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Some features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication at a user equipment (UE), comprising:
receiving, from a first base station, a configuration for reference signal transmission, the configuration comprising a set of uplink transmit power levels and a set of time and frequency resources;
transmitting, based at least in part on the configuration, a plurality of uplink reference signals at different power levels;
receiving from the first base station, based at least in part on transmitting the plurality of uplink reference signals, an instruction to perform a handover to a second base station, the instruction comprising an indication of a selected uplink reference signal of the plurality of uplink reference signals and a power parameter associated with the indicated uplink reference signal; and
performing the handover to the second base station based at least in part on the instruction.

2. The method of claim 1, wherein the instruction further comprises a set of parameters including the power parameter and one or more of a timing advance value or an uplink grant.

3. The method of claim 1, further comprising:
determining an uplink transmit power for transmission to the second base station based at least in part on the selected uplink reference signal and the power parameter.

4. The method of claim 3, further comprising:
transmitting, to the second base station, a handover complete message at the uplink transmit power.

5. The method of claim 3, further comprising:
transmitting, to the second base station, a first random access message of a random access procedure at the uplink transmit power.

6. The method of claim 5, further comprising:
transmitting, to the second base station, a second random access message of the random access procedure at a second uplink transmit power, the second random access message comprising a retransmission of the first random access message,
wherein the second uplink transmit power is higher than the uplink transmit power.

7. The method of claim 1, further comprising:
determining, based at least in part on a measured signal quality, a measurement event; and
transmitting, to the first base station, a measurement report based at least in part on the measurement event, wherein the set of uplink transmit power levels is based at least in part on the measurement report.

8. The method of claim 1, wherein the power parameter comprises a power correction value.

9. The method of claim 1, wherein the instruction further comprises one or more of a timing advance value or an uplink grant.

10. The method of claim 1, wherein the plurality of uplink reference signals comprise sounding reference signal repetitions.

11. An apparatus for wireless communication at a user equipment (UE), comprising:
a first interface;
a second interface; and
a wireless modem coupled to the first interface and the second interface, wherein the wireless modem is configured to:
obtain over the first interface a configuration from a first base station for reference signal transmission, the configuration comprising a set of uplink transmit power levels and a set of time and frequency resources;

output, based at least in part on the configuration, a plurality of uplink reference signals over the second interface for transmission at different power levels;

obtain over the first interface, based at least in part on the plurality of uplink reference signals, an instruction from the first base station to perform a handover to a second base station, the instruction comprising an indication of a selected uplink reference signal of the plurality of uplink reference signals and a power parameter associated with the indicated uplink reference signal; and perform the handover to the second base station based at least in part on the instruction.

12. The apparatus of claim 11, wherein the instruction further comprises a set of parameters including the power parameter and one or more of a timing advance value or an uplink grant.

13. The apparatus of claim 11, wherein the wireless modem is further configured to:

determine an uplink transmit power for transmission to the second base station based at least in part on the selected uplink reference signal and the power parameter.

14. The apparatus of claim 13, wherein the wireless modem is further configured to:

output, to the second base station, a handover complete message at the uplink transmit power.

15. The apparatus of claim 13, wherein the wireless modem is further configured to:

output, to the second base station, a first random access message of a random access procedure at the uplink transmit power.

16. The apparatus of claim 15, wherein the wireless modem is further configured to:

output, to the second base station, a second random access message of the random access procedure at a second uplink transmit power, the second random access message comprising a retransmission of the first random access message, wherein the second uplink transmit power is higher than the uplink transmit power.

17. The apparatus of claim 11, wherein the wireless modem is further configured to:

determine, based at least in part on a measured signal quality, a measurement event; and output, to the first base station, a measurement report based at least in part on the measurement event, wherein the set of uplink transmit power levels is based at least in part on the measurement report.

18. The apparatus of claim 11, wherein the power parameter comprises a power correction value.

19. The apparatus of claim 11, wherein the instruction further comprises one or more of a timing advance value or an uplink grant.

20. The apparatus of claim 11, wherein the plurality of uplink reference signals comprise sounding reference signal repetitions.

21. An apparatus for wireless communications at a user equipment (UE), comprising:

means for receiving, from a first base station, a configuration for reference signal transmission, the configuration comprising a set of uplink transmit power levels and a set of time and frequency resources;

means for transmitting, based at least in part on the configuration, a plurality of uplink reference signals at different power levels;

means for receiving from the first base station, based at least in part on transmitting the plurality of uplink reference signals, an instruction to perform a handover to a second base station, the instruction comprising an indication of a selected uplink reference signal of the plurality of uplink reference signals and a power parameter associated with the indicated uplink reference signal; and means for performing the handover to the second base station based at least in part on the instruction.

22. The apparatus of claim 21, wherein the instruction further comprises a set of parameters including the power parameter and one or more of a timing advance value or an uplink grant.

23. The apparatus of claim 21, further comprising means for determining an uplink transmit power for transmission to the second base station based at least in part on the selected uplink reference signal and the power parameter.

24. The apparatus of claim 23, further comprising:

means for transmitting, to the second base station, a handover complete message at the uplink transmit power.

25. The apparatus of claim 23, further comprising:

means for transmitting, to the second base station, a first random access message of a random access procedure at the uplink transmit power.

26. A non-transitory computer-readable medium storing code for wireless communication at a user equipment (UE), the code comprising instructions executable by a processor to:

receive, from a first base station, a configuration for reference signal transmission, the configuration comprising a set of uplink transmit power levels and a set of time and frequency resources;

transmit, based at least in part on the configuration, a plurality of uplink reference signals at different power levels;

receive from the first base station, based at least in part on transmitting the plurality of uplink reference signals, an instruction to perform a handover to a second base station, the instruction comprising an indication of a selected uplink reference signal of the plurality of uplink reference signals and a power parameter associated with the indicated uplink reference signal; and perform the handover to the second base station based at least in part on the instruction.

27. The non-transitory computer-readable medium of claim 26, wherein the instruction further comprises a set of parameters including the power parameter and one or more of a timing advance value or an uplink grant.

28. The non-transitory computer-readable medium of claim 26, wherein the instructions are further executable by the processor to:

determine an uplink transmit power for transmission to the second base station based at least in part on the selected uplink reference signal and the power parameter.

29. The non-transitory computer-readable medium of claim 28, wherein the instructions are further executable by the processor to:

transmit, to the second base station, a handover complete message at the uplink transmit power.

30. The non-transitory computer-readable medium of claim 28, wherein the instructions are further executable by the processor to:

transmit, to the second base station, a first random access message of a random access procedure at the uplink transmit power.

\* \* \* \* \*